(12) United States Patent
Karagiannis et al.

(10) Patent No.: US 8,351,331 B2
(45) Date of Patent: Jan. 8, 2013

(54) RESOURCE ALLOCATION FRAMEWORK FOR WIRELESS/WIRED NETWORKS

(75) Inventors: Thomas Karagiannis, Cambridge (GB); Christos Gkantsidis, Cambridge (GB); Peter Bernard Key, Cambridge (GB); Richard Harper, Cambridge (GB); Abigail Sellen, Cambridge (GB); Timothy Regan, Cambridge (GB); Richard M. Banks, Egham (GB); Ilias Raftopoulos, Zurich (CH); Dharmaiah Manjunath, Mumbai (IN); Bozidar Radunovic, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 12/820,825

(22) Filed: Jun. 22, 2010

(65) Prior Publication Data

US 2011/0310735 A1    Dec. 22, 2011

(51) Int. Cl.
*H04L 12/28* (2006.01)
(52) U.S. Cl. .................................................... 370/232
(58) Field of Classification Search .................. None
See application file for complete search history.

(56) References Cited

U.S. PATENT DOCUMENTS

| | | | |
|---|---|---|---|
| 7,142,503 B1 | 11/2006 | Grant et al. | |
| 7,453,804 B1* | 11/2008 | Feroz et al. | 370/230 |
| 7,778,170 B2* | 8/2010 | Aboba et al. | 370/230 |
| 8,000,240 B2* | 8/2011 | DelRegno et al. | 370/232 |
| 2002/0176361 A1 | 11/2002 | Wu et al. | |
| 2003/0081623 A1 | 5/2003 | Kiremidjian et al. | |
| 2004/0078733 A1 | 4/2004 | Lewis | |
| 2004/0240451 A1 | 12/2004 | Lee et al. | |
| 2007/0226775 A1 | 9/2007 | Andreasen et al. | |
| 2009/0290491 A1 | 11/2009 | Karagiannis et al. | |
| 2010/0157804 A1* | 6/2010 | Bugenhagen | 370/235 |
| 2010/0177643 A1* | 7/2010 | Matta et al. | 370/248 |
| 2010/0226253 A1* | 9/2010 | Bugenhagen | 370/236 |
| 2011/0151883 A1* | 6/2011 | Bossard et al. | 455/450 |
| 2011/0242979 A1* | 10/2011 | Feroz et al. | 370/235 |

OTHER PUBLICATIONS

Balakrishnan, et al., "An Integrated Congestion Management Architecture for Internet Hosts", ACM, Proceedings of Conference on Applications, Technologies, Architectures, and Protocols for Computer Communication, Cambridge, MA, 1999, pp. 175-187.

(Continued)

*Primary Examiner* — Chirag Shah
*Assistant Examiner* — Amar Persaud
(74) *Attorney, Agent, or Firm* — Zete Law, P.L.L.C.; MacLane C. Key

(57) ABSTRACT

A resource allocation framework for wireless/wired networks is described. In an embodiment, methods of end host based traffic management are described which operate separately from the underlying access control protocol within the network (e.g. wireless MAC protocol or TCP). The rate limits for each flow are set based on per-flow weights, which may be user specified, and based on an estimate of the utilization of the shared resource and the rate limits are adjusted periodically so that the resource is not underutilized or saturated. Some embodiments compute a virtual capacity of the resource which is adjusted to optimize the value of the utilization and then the virtual capacity is shared between flows according to the per-flow weights. Methods for estimating the utilization of a wireless network and the capacity of a broadband access link are also described.

21 Claims, 15 Drawing Sheets

OTHER PUBLICATIONS

Barham, "Explicit Congestion Avoidance: Cooperative Mechanisms for Reducing Latency and Proportionally Sharing Bandwidth", retrieved on Mar. 22, 2010 at <<ftp://ftp.research.microsoft.com/pub/tr/tr-2001-100.doc>>, Microsoft Corporation, Microsoft Research Technical Report, MSR-TR-2001-100, Mar. 25, 2001, pp. 1-16.

Bertsekas, et al., "Data Networks", Prentice-Hall International, Inc., 1987 (2nd Ed. 1991), pp. 1-107.

Bianchi, "Performance Analysis of the IEEE 802.11 Distributed Coordination Function", IEEE Journal of Selected Areas in Telecommunications, Wireless series, vol. 18, No. 3, Mar. 2000, pp. 535-547.

Cho, et al., "Adaptive TCP for Effective and Fair Utilization of High Bandwidth-Delay Product Networks", retrieved on Mar. 22, 2010 at http://www.cs.tamu.edu/academics/tr/tamu-cs-tr-2005-11-3>>, Technical Report TAMU-CS-TR-2005-11-3, Nov. 3, 2005, pp. 1-27.

Dischinger, et al., "Characterizing Residential Broadband Networks", ACM, Proceedings of Internet Measurement Conference (IMC), San Diego, CA, Oct. 2007, pp. 43-56.

Dovrolis, et al., "Packet dispersion techniques and capacity estimation", IEEE/ACM Transactions on Networking, vol. 12, No. 6, Dec. 2004, pp. 963-977.

Gibbens, et al., "Resource pricing and the evolution of congestion control", available from <<http://www.statslab.cam.ac.uk/~frank/evol.html>>, Automatica, vol. 35, 1999, pp. 1969-1985.

Gkantsidis, et al., "Traffic Management and Resource Allocation in Small Wired/Wireless Networks", ACM, Proceedings of International Conference on Emerging Networking Experiments and Technologies (CoNEXT), Rome, IT, Dec. 2009, pp. 265-276.

Heusse, et al., "Performance Anomaly of 802.11b", IEEE INFOCOM, San Francisco, CA, Mar. 2003, pp. 1-8.

Kelly, et al., "Rate control for communication networks: shadow prices, proportional fairness and stability", Journal of the Operational Research Society, vol. 49, No. 3, 1998, pp. 237-252.

Kumar, et al., "Wireless Networking", Morgan-Kaufmann Publishers, 2008, pp.

Kunniyur, et al., "Analysis and Design of an Adaptive Virtual Queue (AVQ) Algorithm for Active Queue Management", ACM, Proceedings of Conference on Applications, Technologies, Architectures, and Protocols for Computer Communications, San Diego, CA, 2001, pp. 123-134.

Liu, et al., "Adaptive Wireless Services for Augmented Environments", retrieved on Mar. 22, 2010 at <<www.tansu.alpcan.org/papers/Liu_Alpcan_Bauckhage-Mobiquitous09.pdf>>, IEEE Conference on Mobile and Ubiquitous Systems: Networking and Services (MobiQuitous), Jul. 2009, pp. 1-8.

Machiraju, et al., "Adding Definition to Active Probing", ACM SIGCOMM Computer Communication Review, vol. 37, No. 2, Apr. 2007, pp. 17-28.

Speakman, et al., "RFC3208—PGM Reliable Transport Protocol Specification", retrieved on Jun. 23, 2010 at <<http://www.faqs.org/rfcs/rfc3208.html>>, The Internet Society, Dec. 2001, pp. 1-78.

"UK broadband speeds 2008: Consumer experience of broadband performance: initial findings", retrieved on Jun. 18, 2010 at <<http://www.ofcom.org.uk/research/telecoms/reports/bbspeed_jan09/>>, Ofcom, pp. 1-3.

Vaidya, et al., "Distributed Fair Scheduling in a Wireless LAN", IEEE Transactions on Mobile Computing, vol. 4, No. 6, 2005, pp. 616-629.

* cited by examiner

RESOURCE ALLOCATION FRAMEWORK FOR WIRELESS/WIRED NETWORKS

BACKGROUND

Home networks and small enterprise networks typically comprise a number of end hosts connected to the internet via a central gateway, such as a wireless access point (AP) or router. All the hosts may be connected via wireless links to the gateway or there may be a mix of wireless and wired hosts (which may also be referred to as wireline hosts). These small networks may comprise a mix of different types of computing devices as end hosts and this is particularly the case for home networks where the end hosts may include desktop and laptop computers, games consoles, home servers, media centers, smart phones, internet protocol (IP) telephones etc. The different end hosts within the network and the different applications running on the end hosts may compete for access to resources within the network.

Traffic management within such networks is problematic and where controls are implemented, this is typically done by application prioritization at the central gateway. One control method uses port-based filters; however, this can be ineffective or inaccurate, particularly for applications, such as some IP telephony services, which use arbitrary port numbers. Another option is to use packet payload inspection; however devices providing payload classification functionality are rarely found in small networks and the devices are costly and complex. Furthermore, such devices are not easily extensible, with policies that focus on specific application types (e.g. gaming traffic) and cannot be modified, for example to take into account user interests.

In a network which comprises a number of wireless end hosts connected to an AP, further problems arise in attempting to prioritize one wireless flow over another wireless flow. Even after applying per flow priorities at the AP, it is not feasible to prioritize one flow because the wireless MAC (medium access control) is distributed and the scheduler is fair, and hence allocates equal resources to the two flows by design.

The embodiments described below are not limited to implementations which solve any or all of the disadvantages of known traffic management methods.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A resource allocation framework for wireless/wired networks is described. In an embodiment, methods of end host based traffic management are described which operate separately from the underlying access control protocol within the network (e.g. wireless MAC protocol or TCP). The rate limits for each flow are set based on per-flow weights, which may be user specified, and based on an estimate of the utilization of the shared resource and the rate limits are adjusted periodically so that the resource is not underutilized or saturated. Some embodiments compute a virtual capacity of the resource which is adjusted to optimize the value of the utilization and then the virtual capacity is shared between flows according to the per-flow weights. Methods for estimating the utilization of a wireless network and the capacity of a broadband access link are also described.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
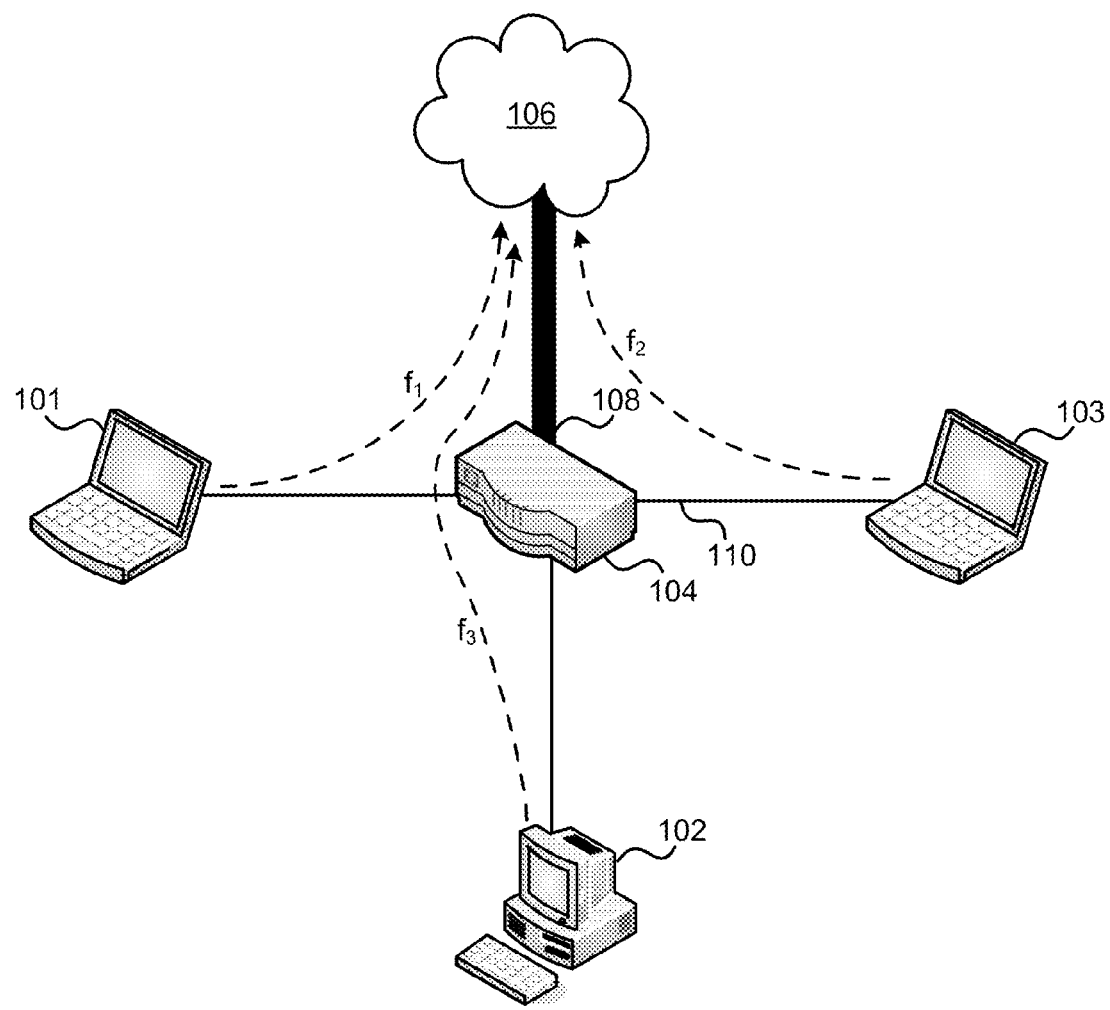
FIGS. 1 and 3 are schematic diagrams of small networks.
Figure 2:
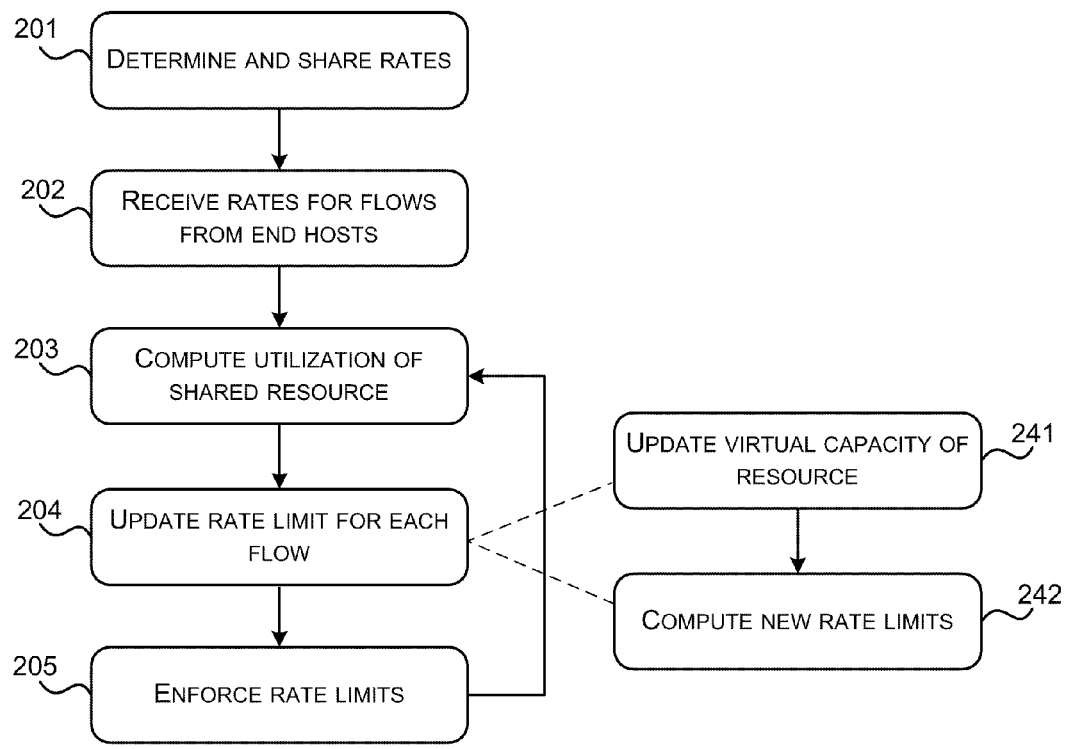
FIGS. 2 and 4 are flow diagrams of example methods of network management within small networks, such as those shown in FIGS. 1 and 3.

FIG. 1 is a schematic diagram of a small network which comprises three end hosts 101-103 connected to a central gateway 103 which itself is connected to the internet 106. The term 'small network' is used herein to refer to networks with not more than tens of end hosts, although for the sake of clarity, those networks shown in the FIGs comprise a very small number of end hosts. FIG. 2 shows a flow diagram of an example traffic management method which may be implemented in the network of FIG. 1. For the purposes of explanation only, it is assumed that the shared constrained resource in FIG. 1 is the internet uplink 108 and the links 110 between the individual end hosts and the gateway are not considered at this time. These links 110 are shown as wired links but may alternatively be wireless links.

The traffic management method involves end hosts (e.g. each end host) determining and sharing rates for data flows at the end host (block 201), and these rates may comprise sending rates and/or receiving rates. This determination of rates may involve measurement of rates and in some examples, this data may be available to the operating system on the end host and the method may therefore involve polling the operating system for such information (which may be application specific performance information). There are three flows shown in FIG. 1, labeled $f_1$, $f_2$ and $f_3$. In this example, a flow corresponds to a particular connection (e.g. between end host 101 and a particular destination) and is also known as a TCP flow. Depending on the granularity which is used within the method, however, a flow may alternatively correspond to a particular application (e.g. a file sharing application, an email application etc) or to a particular end host (e.g. everything originating at end host 101). The sharing of rates (within block 201) may comprise broadcasting the rates to the other nodes, or there may be a central entity (e.g. the gateway 103 or other entity not shown in FIG. 1) which collates this data and sends it (i.e. the rate data) out to the end hosts, in which case the sharing of rates (in block 201) may comprise transmitting the data to the central entity.

The shared data (from block 201) is received by an entity (in block 202) and used to compute the utilization of a shared resource (block 203), which in the example shown in FIG. 1, is the internet uplink 108. Having computed the utilization, this information along with some defined weights for each flow, can be used to update a rate limit for each flow (block 204) which can then be enforced (block 205). The method is then repeated (as indicated by the arrow back to block 202) to incrementally and dynamically update the rate limits. This enables the method to adapt to accommodate changes in rates which may be a result of changing activity at end hosts or in some cases (e.g. wireless networks) may be the result of implementing the updated rate limits (as described in more detail below). An alternative approach which computes the utilization once and allocates the excess capacity according to weights but does not perform this dynamic adjustment does not function well. This is mainly due to the TCP control mechanism that is also used to regulate the flow rates (both of the TCP flows and other flows containing multiple TCP flows).

As described above, the rate data shared (in block 201) may comprise sending and/or receiving rates. Where flows originate outside the network (e.g. in the internet), rate limiting may be performed at the receiver and therefore data on the receiving rates for this flow may be shared. For internal flows (i.e. flows with both the source and the destination within the network), rate limiting may be performed at either of the endpoints, i.e. at the sender or the receiver. In an example, the rate limiting may be applied at the sender and this decision may be based on practical reasons, e.g. availability of rate limiting technologies and their relative performance. In such an example, flows are controlled at the sender unless the sender is outside the control of the traffic management method (e.g. because the sender is outside the network or cannot operate the method for some reason) and in such an instance the sender is simulated at the receiver and the rate limiting is applied there. In an example, a network may comprise some legacy equipment which is unable to perform one or more of the method steps (e.g. determining and sharing rates) and in such an instance the rate control of any flows originating at the legacy end host would be performed at the receiving end host.

The methods described above may be used to rate limit all flows or only a subset of the flows. For example, the methods may be used to rate limit fast flows and slow flows may not be regulated.

The methods described herein enable traffic management in a flexible manner within small networks. Using the methods described it is possible to take account of user interests (through the per-flow weights and the adaptive process) and/ or to give priority to a user device over all other devices (irrespective of the applications used).

The per-flow weights which are used (in block 204) to compute the per-flow rate limits may be user-defined or may be defined in any other manner (e.g. they may be automatically determined based on one or more factors, where the factors may include the user, the application, the end host etc). These weights specify the relative priorities of the different flows and are used to share the constrained resource between flows, as described in more detail below. In an example, a user may define that flow $f_1$ in FIG. 1 is twice as important as the other two flows and may therefore define that flow $f_1$ has a weight $w_1=2w$, and the other flows, $f_2$ and $f_3$, have weights $w_2=w_3=w$.

The computation of the utilization and the updated rate limits (in blocks 203-204) may be implemented independently on each end host (but using the same data) or may be implemented centrally and the resultant rate limits communicated to the appropriate end hosts for implementation (in block 205). Where the computation (in blocks 203-204) is performed centrally, the step of receiving (block 202) is performed at the central entity and the data is received from each end host (as transmitted in block 201). Alternatively, where the computation (in blocks 203-204) is performed at each end host, the data is received (in block 202) at an end host and the data received comprises data for other end hosts and not necessarily data for that particular end host (although this data may be provided where the data for all end hosts is collected by a central entity and then transmitted to each end host). The computation steps 203-204 are described in more detail below.

In addition to sharing rates (in block 201), additional information may be shared which may then be used to perform the computations in blocks 203-204. This information may be dependent upon the technology used, e.g. for wireless hosts, the rate data may include both an association rate and an application rate. Other parameters which may be shared may include one or more of: the average packet size, the technology used (and any specific parameters associated with the technology, e.g. RTS/CTS on/off), whether packets are directed internally or externally to the network etc and further examples of such parameters and how they may be used are described below.

In situations where the capacity, C, of the shared resource is known, the utilization, $\rho$, may be computed (in block 203) using:

$$\rho = \frac{(R_1 + R_2 + R_3)}{C}$$

where $R_1$, $R_2$, and $R_3$ are the sending rates of flows $f_1$, $f_2$ and $f_3$. However, in many situations, this capacity is not known and/or may change dynamically and methods for estimating the capacity and/or the utilization are described below. The utilization of the resource is computed so that the rate limits can be adjusted to avoid under-utilization of the resource and also to avoid saturation of the resource. If flows are allowed to send excessive data such that the resource becomes saturated, congestion occurs and the system cannot guarantee allocation of the resource according to the per-flow weights. When congestion occurs, the sending rates achieved by each flow will not be affected by the rate limits set in this method (in block 204 and enforced in block 205) but instead will be affected by the underlying protocols operating within the network (e.g. TCP or the wireless MAC).

The updating of the rate limits based on both utilization and weights (in block 204) uses a concept of a virtual capacity of the resource, where the virtual capacity, X, may be larger than the real capacity, C, of the resource. For example, where the weights, w, specify that the flows are of equal priority, e.g. $w_1=w_2=w_3$ in the example of FIG. 1, the real capacity of the resource may be split equally such that each flow is limited to one third of the capacity (C/3). However, if one flow is constrained elsewhere in the network (e.g. in the link between the end host and the gateway 104), the flow may not be able to use the entire allocated rate (e.g. such that $R_1<C/3$) and this leads to under-utilization of the shared resource. Given that the resource is constrained, this is inefficient and ideally the unused capacity is allocated to the other two flows. In such an example, the virtual capacity, X, may be increased above the real capacity, C, such that the rate limits are set to one third of the virtual capacity:

$$x_n = \frac{w_n X}{\sum w}$$

where n is the index of the flow (e.g. for $f_1$, n=1). This increases the rate limits for all three flows and hence allows the two flows which are able to transmit more data to do so, which in turn increases the utilization of the shared constrained resource.

As shown in FIG. 2, the step of updating the rate limit for each flow (block 204) may therefore comprise updating the virtual capacity of the resource based on the computed utilization (block 241) and computing the new rate limits using the updated virtual capacity (block 242). The new rate limits may therefore be considered to comprise a fraction of the updated virtual capacity, where the actual fraction is determined based on the per-flow weights. Where the utilization is below a threshold (which may be set to a value less than one, as described in more detail below), the virtual capacity may be increased (in block 241, as described above) and where the utilization is above a threshold (which may be the same or different to the previously mentioned threshold), the virtual capacity may be decreased. In an example, the following algorithm may be used to update the virtual capacity:

$$X(t+1) \leftarrow X(t) + \kappa \cdot X(t) \cdot [1-p(t)-p(t)\rho(t)] \quad (1)$$

where $p=\rho^B$ and B,κ are constants. In an example, B is a small number, e.g. B=5 and a larger value of B increases the utilization at the cost of responsiveness. The value of κ may be set to a small value, e.g. such that $\kappa<1/(B+1)$. It can be shown using control theory that the delayed feedback algorithm of equation (1) is locally stable provided that κ is sufficiently small, i.e. provided that:

$$\kappa \leq \min\left(\frac{1}{B+1}, \frac{M}{RTT}\right)$$

where RTT is the round trip time and M is the observation window, such that the rate limit is updated (using the method of FIG. 2 or 4) every M seconds, where in an example implementation M=2.

Equation (1) "forces" $\rho=(1-p)/p$: if $\rho>(1-p)/p$ the increase is negative, otherwise it is positive. In an example, where B=5, this gives the set point of $\rho\approx0.88$ (which may also be referred to as the 'target value' for the utilization). Equation (1) therefore represents the water-filling algorithm: the virtual capacity of a resource is increased slowly until it gets saturated (where in using this equation, the saturation point is defined at a point where ρ<1, e.g. $\rho\approx0.88$ for B=5) and its virtual capacity reaches the steady point.

The method described above does not need to know the real capacity of the shared resource, but only the resource utilization. The resource utilization may be determined (in block 203) by observing queue sizes within the network or directly when the resource capacity and the traffic loads are known. Methods for computing utilization and capacities for particular network/resource types are described in more detail below.

Figure 3:
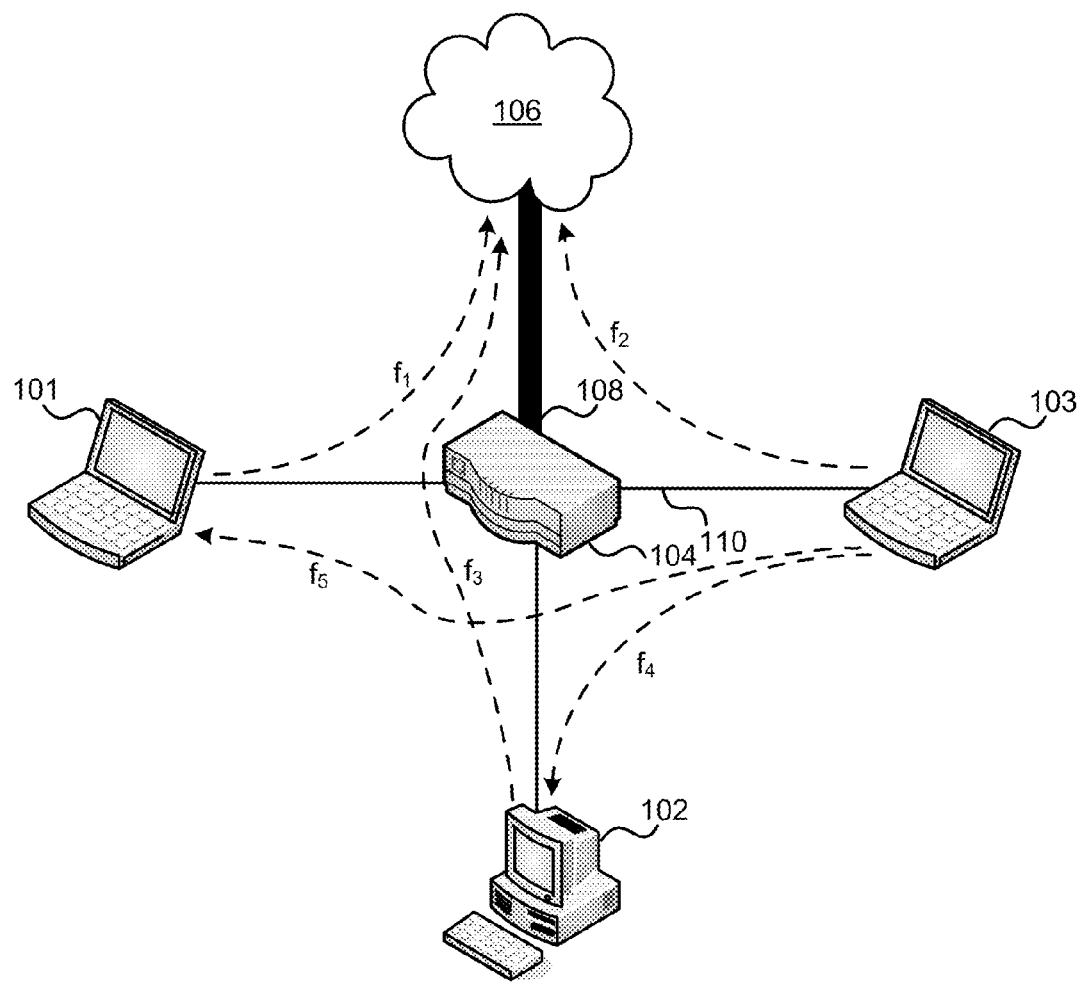
Figure 4:
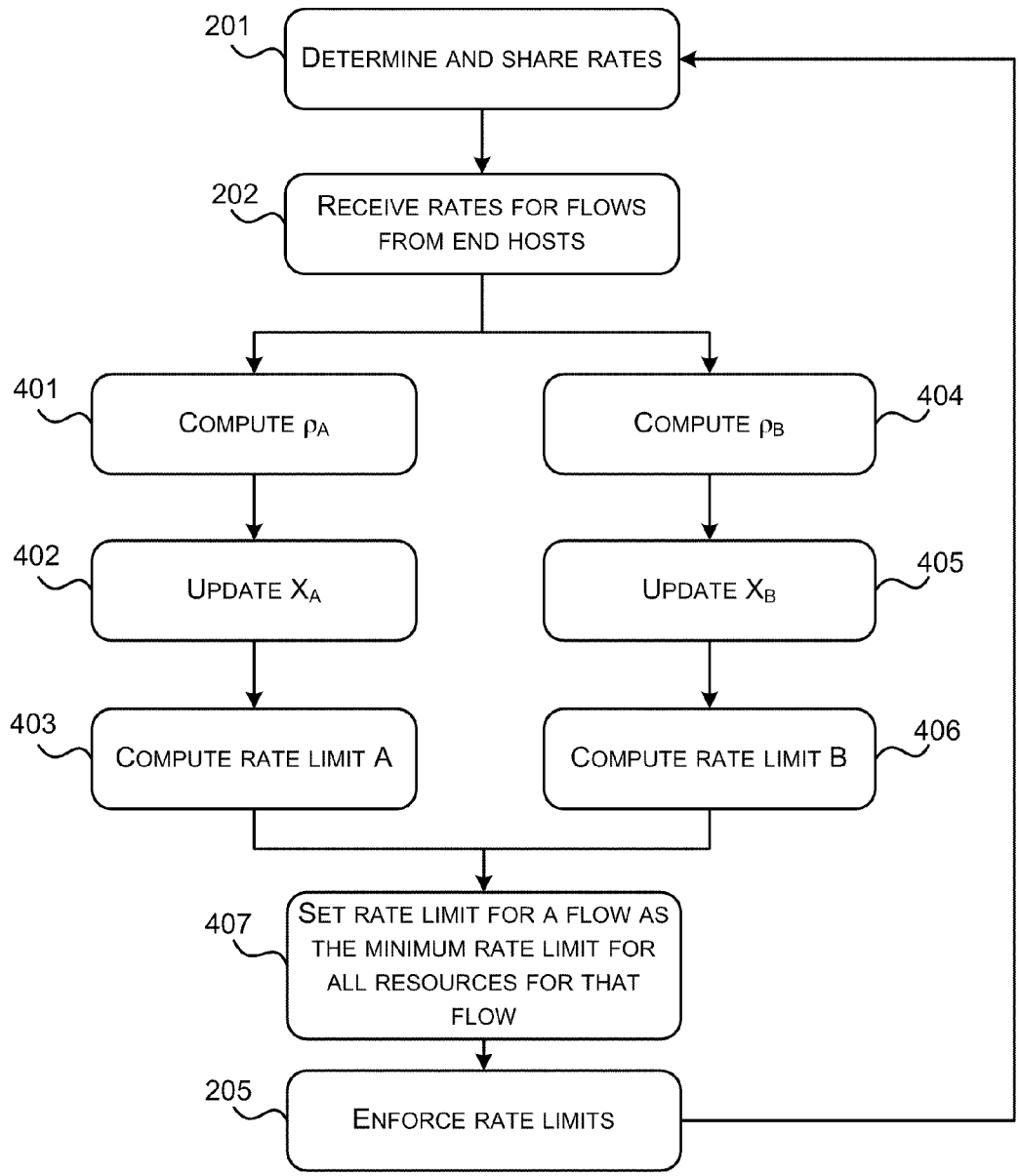

The above method is described in relation to a single constrained shared resource; however there may be multiple constrained shared resources within a network, as shown in the schematic diagram in FIG. 3, and the methods may be extended to such a situation, as shown in the example flow diagram of FIG. 4. FIG. 3 shows the network of FIG. 1 with two additional flows $f_4$, $f_5$ originating from end host 103. This may result in the link 110 between the end host 103 and the gateway 103 being a shared constrained resource, in addition to the internet uplink 108. For the purposes of explanation, the internet uplink 108 may be referred to as resource A and the local link 110 to the gateway may be referred to as resource B. As shown in FIG. 4, the method is very similar to that shown in FIG. 2 and described above; however, the steps to compute the utilization (blocks 401 and 404) and rate limit for each flow (blocks 402-403, 405-406) are performed separately for each resource. Although FIG. 4 shows these steps being performed in parallel for each resource, the steps may alternatively be performed serially or in any combination thereof. Having computed the rate limits for each flow based on the utilization of each resource, the rate limit for a flow is set (in block 407) as the minimum rate limit of those computed, i.e. if the rate limit set (in block 403) based on the utilization of resource A is smaller than the rate limit set (in block 406) based on the utilization of resource B, then the rate limit for resource A is used (in block 407) and vice versa.

This method may alternatively be described mathematically as follows and in this following section it assumed, for clarity of explanation, that all flows are controlled at the sender and therefore the rates are referred to as sending rates. It will be appreciated that, as described above, where a flow cannot be controlled at the sender according to this method (e.g. the sender is outside the network), rate control may be implemented instead at the receiver and in this situation, receiving rates may be shared and used to compute utilization.

Let $x_f$ denote the rate of flow f and $F_A$ be the set of flows that use resource A (whatever that resource may be, e.g. wired, wireless, uplink, or downlink). Each resource A has a set of feasible rates $\chi_A$ and rates $(x_f)_{f \in F_A}$ are feasible if $(x_f)_{f \in F_A} \in \chi_A$. For example, for uplink U of capacity $C_U$, the feasible rate set is defined as the set of all possible flow rates such that the sum of all rates is smaller than the link capacity, $$\chi_U = \left\{ (x_f)_{f \in F_U} \;\middle|\; \sum_{f \in F_U} x_f \leq C_U \right\}$$

The set of feasible rates for the downlink $\chi_D$ is defined analogously and the set of feasible rates for other resources may also be defined.

Let $w_f$ be the weight of flow f A fair share of resource A for flow f is defined as:

$$x_f^A = \min\left(x_f^{-A}, w_f X_A \bigg/ \sum_{f' \in F_A} w_{f'}\right) \quad (2)$$

where $x_f^A$ is the maximum possible sending rate of flow f assuming that A has infinite capacity (i.e., f is not bottlenecked in A), and $X_A$ is the virtual capacity (which may also be referred to as the nominal fair share) of resource A. $X_A$ is defined as:

$$\max X_A$$
$$\text{s.t.} \left\{\min\left(x_f^{-A}, w_f X_A \bigg/ \sum_{f' \in F_A} w_{f'}\right)\right\}_{f \in F_A} \in \chi_A$$

The rate of flow f is then the smallest of the fair shares of all resources used by f, $$x_f = \min_{A: f \in F_A} x_f^A \quad (3)$$

In other words, if the bottleneck for flow f is resource A, then f will get rate $$x_f = w_f X_A \bigg/ \sum_{f' \in F_A} w_{f'}$$

As a simple example, assume a resource A with capacity $C_A$. By definition $x_f \le x_f^A$. If all flows $F_A$ are rate limited at A, i.e., $x_f = x_f^A$, and A is fully utilized, i.e., $\Sigma_{f \in F_A} x_f = C_A$, then $$C_A = \sum_{f \in F_A} x_f = \sum_{f \in F_A} x_f^A = \sum_{f \in F_A} w_f X_A \bigg/ \sum_{f' \in F_A} w_{f'} = X_A \quad (40)$$

If a subset of the flows $F_A$ are rate limited elsewhere in the network (i.e., not in A), which implies $x_f < x_f^A$ for some f, then to achieve full utilization of A, the following condition applies:

$$C_A = \sum_{f \in F_A} x_f < \sum_{f \in F_A} x_f^A = \sum_{f \in F_A} w_f X_A \bigg/ \sum_{f' \in F_A} w_{f'} = X_A$$

As described above, by increasing $X_A$ above the (real) capacity $C_A$, the fair share of all flows increases, and that allows the flows that are bottlenecked at A to claim the excess capacity that is not used by flows that are rate limited elsewhere in the network.

As described above, and shown in FIG. 4, the method enables the rate limits for each constrained resource to be computed independently, i.e. in the example of FIG. 4, blocks 401-403 are performed independently of blocks 404-406. This provides a method which is scalable and is able to accommodate multiple constrained shared resources. It will be appreciated that not all shared resources will affect all flows (in the example of FIG. 3, link 110 affects flows $f_2$, $f_4$ and $f_5$ but not $f_1$ or $f_3$) and in larger networks this may result in a complex relationship between flows and resources. The independent nature of the method of FIG. 4 means that the problem remains manageable.

The goal of the method shown in FIG. 4, which may be extended beyond the two resources shown and may be implemented as a rate controller (e.g. in a central entity or in a distributed manner on end hosts), is to estimate the virtual capacity values for all resources (i.e. $X_A$), and then use it to compute the rate limits for each connection (from equations (2) and (3)). Underestimating $X_A$ results in very conservative rate limits and hence resource underutilization. Overestimating $X_A$ allows flows to send excessive traffic and create congestion. During the congested periods, the system cannot guarantee allocation of the resource according to the flow weights. In a more realistic scenario $X_A$ needs to be adapted with time, to keep track of the active network flows and their instantaneous rates. An algorithm for adapting $X_A$ is described above and shown in equation (1). Increases in $X_A$ and the associated rates that do not impact a low utilization is a signal that there is not enough demand for A. In that case, it is possible to safely ignore A, until the observed utilization increases.

It is easy to verify that the resource mechanism described above is the weighted max-min fairness, hence the vector $(x_f/w_f)_f$ is max-min fair on the set of all feasible rate vectors in the network. The absolute values of the weights $w_f$ are not important and the allocations depend on the ratio of the weights. The max-min fair allocation can be achieved using a water-filling approach, as described above, in which the virtual capacity of each resource A is gradually increased until the resource is saturated. This is done independently at all resources and may be performed in parallel.

The methods described above involve the computation of the utilization of a resource (blocks 203, 401 and 404) and the method used for this computation depends on the technology of the resource. For a wired resource, such as a broadband link 108 or a wired link 110 between an end host and a gateway the utilization may be defined as:

$$\rho_A = \left(\sum_{f \in F_A} \hat{x}_f\right) \bigg/ \beta C_A \quad (4)$$

where $\hat{x}_f$ is the actual rate (e.g. as shared in block 201), compared to the assigned rate (or rate limit) $x_f$. In equation (4), the utilization is scaled by a factor of $1/\beta$, where $\beta<1$ (e.g. $\beta=0.95$) to bound the utilization away from a value of one so as to protect against traffic fluctuations that may lead to saturation. As described above, during saturation the rate allocations depend on the network protocols and are not strictly determined by the flow weights.

Determining the Capacity of a Broadband Link

Equation (4) relies on the capacity of the wired resource, $C_A$, being known. Known methods of determining the capacity of a broadband link (e.g. link 108 in FIG. 1) assume that there are two entities which exchange specially constructed sequences of packets (often referred to as packet trains in the literature). However, in some situations it may be useful to be able to estimate the capacity without the involvement of a second entity (e.g. an entity connected to the far end of link 110 within the internet 106) and without loading the network with packets, particularly where the resource is already constrained and may be operating close to saturation.

Figure 5:
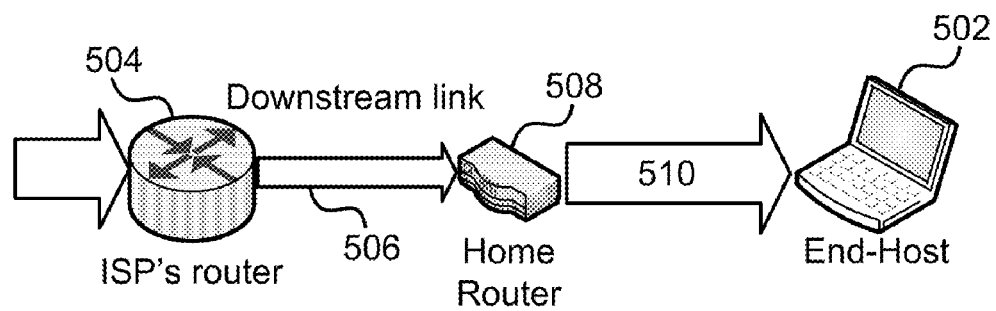
FIG. 5 is a schematic diagram showing a broadband access link and the packet spacing resulting from such a link.
Figure 5:
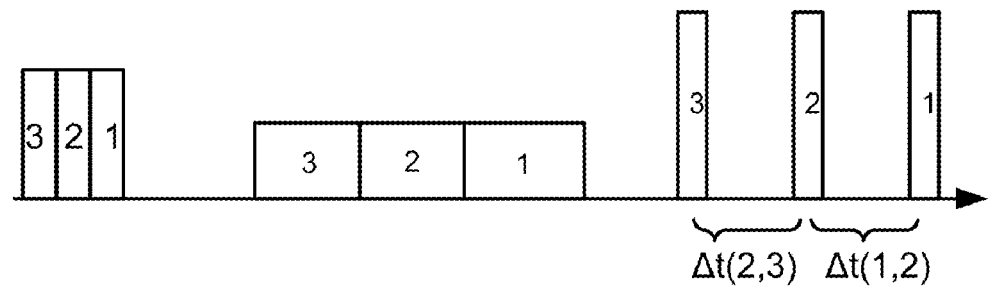
Figure 6:
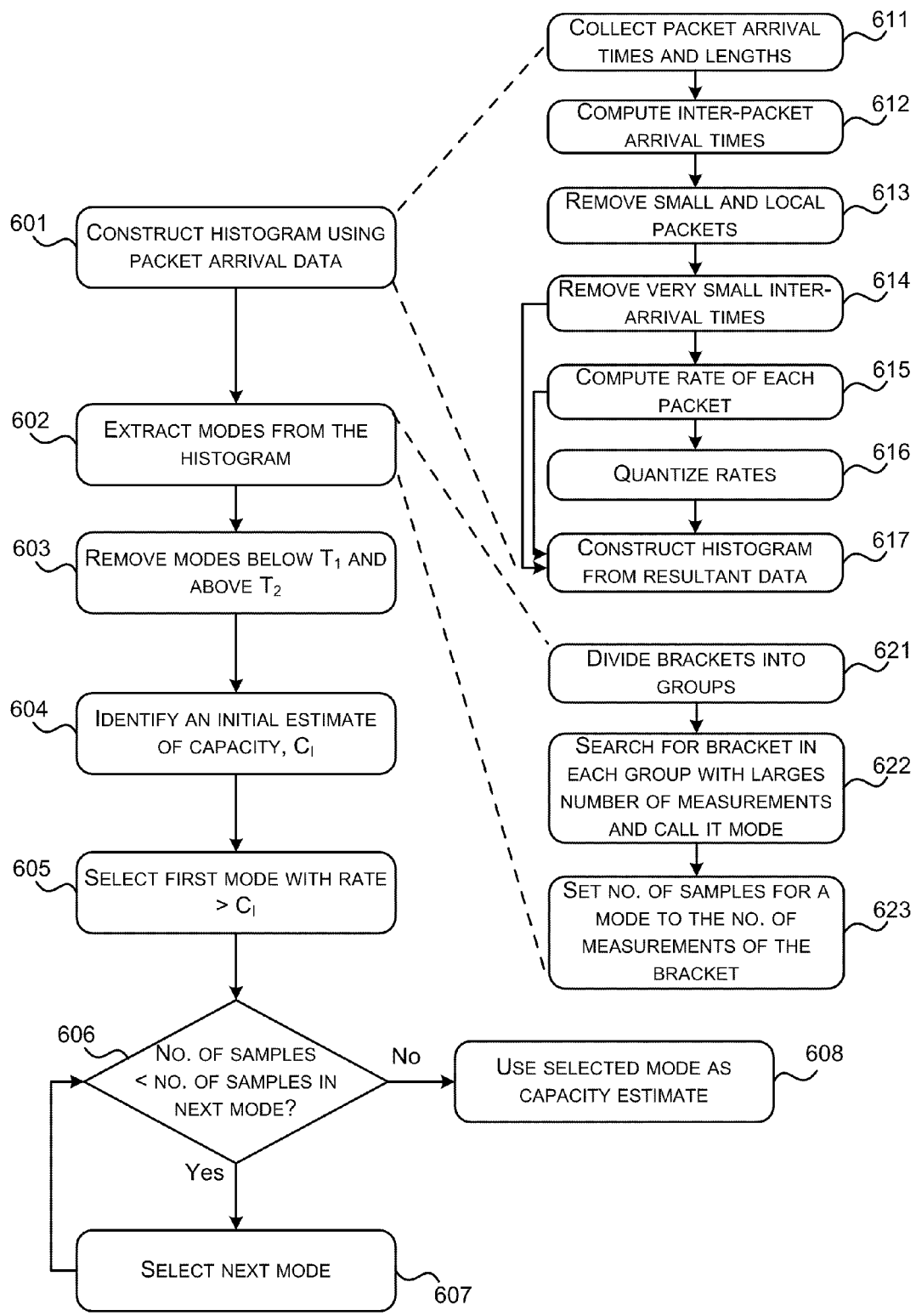
FIG. 6 is a flow diagram of an example method of estimating the capacity of a broadband access link.
Figure 7:
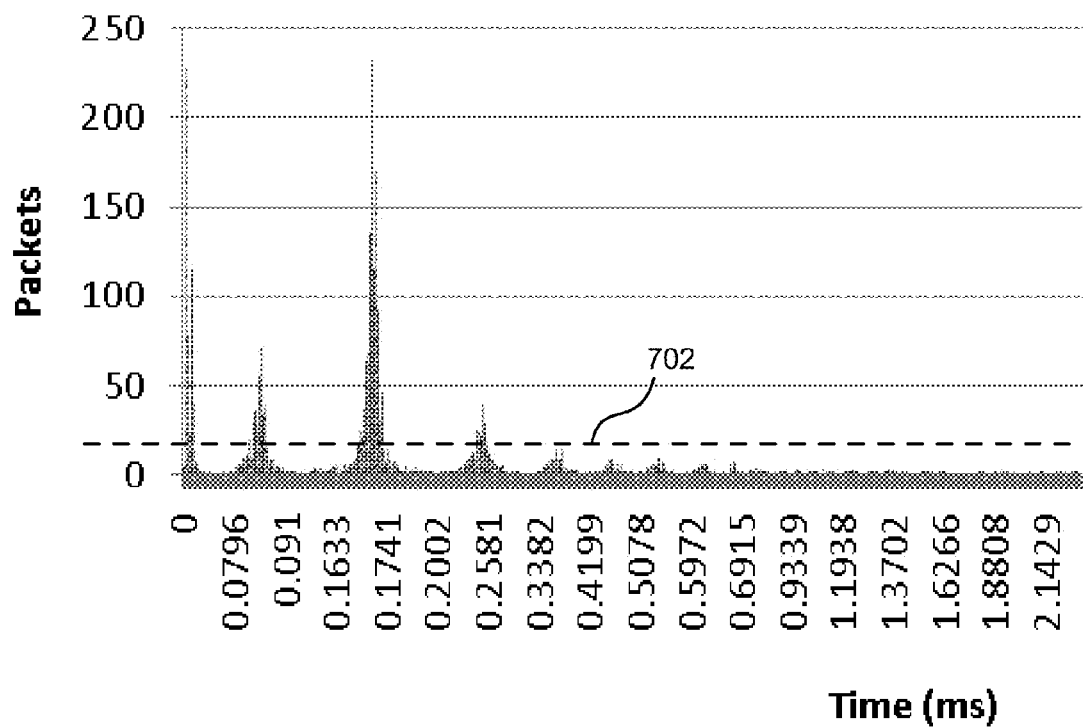
FIG. 7 is an example of a histogram used in the method of FIG. 6.

A passive method of estimating the downlink broadband capacity can be described with reference to FIGS. 5-7. FIG. 5 is a schematic diagram of an access (broadband) link and the packet spacing due to that link and FIG. 6 is an example flow diagram of the method. FIG. 5 shows a stream of packets 1-3 destined to an end host 502 inside a home network (or other small network) and it is assumed that these packets arrive back-to-back in the router 504 (the ISP's router) before the access link 506. The time spent in transmitting the packets to the home router 508 depends on their length and the speed of the downstream link 506. Since the downstream capacity of the access link is typically much smaller than the internal capacity of the home network (as indicated by the larger arrow 510), each packet will spend more time being transmitted to the home router 508 compared to the transmission time from the home router 508 to the end host 502. The speed difference will introduce non-negligible packet inter-arrival times at the end host and these are indicated as $\Delta t$ (1,2) and $\Delta t$ (2,3) in FIG. 1. These packet inter-arrival times are theoretically equal to (Packet Length)/(Downstream capacity), under the assumption that the capacity of the link between the home router and the end host is significantly larger.

It is often the case that packet streams arise due to TCP's behavior. However, it is practically difficult to apply the naïve approach described above to estimate the capacity of the downstream link for a number of reasons. First, it is possible that packets destined to other end hosts insert themselves in the packet stream observed by the particular end host 502. Second, scheduling decisions at the routers may introduce timing errors. Packet losses also introduce errors in the measurements. Small packets have a large constant overhead, compared to the transmission time that depends only on the packet length. In practice, there are multiple bottlenecks in the path (including in the network connecting the home router to the end host), and those increase the noise in the measurements.

However, because the observation point (which is usually the end host 502, but may alternatively be the home router 508) is very close to the downstream link 506, whose capacity is to be estimated, the downstream capacity may be expected to have a large effect on the observed packet inter-arrival times. In order to infer the capacity, a histogram is constructed based on packet arrival data (block 601). This histogram may, for example, be a histogram of inter-packet arrival times, with the x-axis showing $\Delta t$, as shown in the example in FIG. 7, alternatively the histogram may be a histogram of rates and a method for calculating rates from arrival times is described below (see description of block 615).

The histogram may be constructed (in block 601) by collecting data on all packet arrival times and packet lengths (block 611) and computing the packet inter-arrival times (block 612). In an example, the Event Tracing for Windows (ETW) facility in the Microsoft® Windows® operating system (OS) may be used and similar facilities exist in other systems. Small packets (e.g. packets of less than 1000 bytes in an example implementation) and the associated inter-arrival times (with the before and after packets) are removed from the trace as well as "local" packets and their associated inter-arrival times (block 613). A packet is considered a local packet when both source and destination endpoints belong to the internal (small) network (e.g. packets from flows $f_4$ and $f_5$ in the example of FIG. 3), which means that the packet has not traversed the broadband link which is of interest. Very small inter-arrivals times (e.g. less than 0.05 msec) are also removed from the trace (block 614) since they typically result from scheduling decisions in the monitoring host.

The remaining inter-arrival times $\Delta t$ are used to construct the histogram (block 617). Where the histogram shows inter-packet arrival times (as in FIG. 7) the data can be used directly (as indicated by the arrow from block 614 to block 617); however, where the histogram is a histogram of rates, the associated packet lengths (L) are used to compute $L/\Delta t$, which may be referred to as the "rate of the packet" (block 615). The computed rates may also be quantized (block 616) in fixed windows (e.g. of 40 Kbps) before creating the histogram (in block 617).

The histogram may be constructed (in block 601) as packets arrive and the method may wait until a sufficiently large number of samples are stored in the histogram before processing the histogram data (e.g. in block 602 onwards). In an example implementation that limit may be set to 15000 samples.

The next step is to extract the modes from the histogram (block 602). These modes are local maxima and may be computed as follows:

divide the buckets of the histogram into groups (block 621), where a group is a set of continuous buckets such that all the buckets in the group have values above a threshold K (as indicated by dotted line 702 on the example histogram in FIG. 7), and the buckets on the left and right of group have small values below the threshold K (in an example implementation, K=10 measurements);

search for the bucket in the group with the largest number of measurements, and call it the mode of the group (block 622) and repeat to find the modes for all groups; and set the number of samples associated with a mode to the number of measurements of the corresponding bucket (block 623).

Having identified all the modes, some of the modes may be removed in an optional step (block 603). All modes that correspond to rates below a first threshold, $T_1$, e.g. 500 Kbps and above a second threshold, $T_2$, e.g. 25 Mbps, may be removed (in block 603) as these are likely to be due to bottlenecks away from the bottleneck link or in the local network respectively. The choice of those limits is based on the current state of the technology where almost all broadband offerings promise download rates in that range and as technology develops the appropriate values of these thresholds will change accordingly. Where the histogram is of inter-arrival times (as in FIG. 7) instead of rates, these thresholds may be set accordingly. The purpose of this step (block 603) is to eliminate estimates that are clearly not correct and in some embodiments, this step may be omitted (as indicated by the arrow from block 602 to block 604 in FIG. 6).

An initial estimate of the capacity, $C_I$, is identified (block 604) and this may value may be determined using the technique described below with reference to FIG. 8, or by active measurements, or by picking an appropriate constant or any combination of methods. In an example implementation, a constant value of 1.5 Mbps is used as the initial estimate (in block 604) if the method of FIG. 8 did not produce a value. The method then comprises examining the modes that have rates larger than $C_I$, starting from the mode that is closest to $C_I$ (selected in block 605). The next mode (i.e. the next mode with a higher rate) is only selected (in block 607) if the number of samples in that next mode is larger than the number of samples of the currently selected mode ('Yes' in block 606). Where the selected mode (from either block 605 or 607 for subsequent iterations) contains more samples than the next mode ('No' in block 606), the selected mode is used as the estimate of the capacity of the channel (block 608).

Experimental results have shown that both in practice (in various ADSL and Cable home networks) and in simulated environments the method of FIG. 6 results in a very small number (typically 2-3) of modes in the range of consideration, (e.g. between the two thresholds $T_1$ and $T_2$) even under moderate traffic (e.g. a few 10's of Kbps for short periods). Moreover, the estimated values were typically not more than 100-200 Kbps from active estimations of the capacity (in the case of practical settings) and of the rate of the rate limiter (in simulated environments). The methodology described above accurately estimates capacity in theory (i.e. when there are no factors introducing noise), and the data processing described above effectively removes the noise.

The technique described above can be used to estimate the capacity of a link when the observation point is placed after the link. This is typically the case for the downstream capacity of the Internet access link. In order to estimate the upload capacity of a link, the method shown in FIG. 8 may be used which is based on sending pairs of ICMP (Internet Control Message Protocol) packets of different lengths.

Periodically (e.g. every 1 min in an example implementation) two ICMP packets are sent (block 801). One packet is of small size $L_S$ (e.g. 700 bytes) and one packet is of large size $L_L$ (e.g. 1400 bytes) and the packets are arranged such that they are destined to a remote Internet address, but have a small TTL (time to live) and as result they expire at the router on the other size of the broadband link (e.g. router 504 in FIG. 5). The ISP's router will then send a small ICMP control message announcing that the packets indeed expired. For each of the two ICMP packets sent (in block 801), the time difference between sending the packet and the arrival of the corresponding ICMP reply message is measured (block 802) and these may be denoted $\Delta_S$ and $\Delta_L$. Then, the uplink capacity is computed (in block 803) using:

$$C_U = (L_L - L_S)/(\Delta_L - \Delta_S)$$

The method (blocks 801-802) may be repeated multiple times (as indicated by the arrow from block 802 to block 801 in FIG. 8), e.g. 20 times in an example implementation, and the smallest recorded times (from block 802) used to compute the uplink capacity (in block 803).

The same method can be used to provide an initial estimate of the download capacity (e.g. as required in block 604 of FIG. 6). However, in this case, the ICMP packets (sent in block 801) are destined for the router 504 on the other side of the access link. In this case, the ICMP replies (received in block 802) carry the entire payload of $L_S$ and $L_L$ bytes and therefore in computing the download capacity (in block 803), the times necessary for uploading the packet (which may be recorded when estimating the uplink capacity) are subtracted from the recorded time differences. Hence, if the recorded time differences (between sending the ICMP packets and receiving the ICMP replies, in block 802) are $\Delta_S^D$ and $\Delta_L^D$, then the download capacity estimate is computed (in block 803) using:

$$C_D = (L_L - L_S)/((\Delta_L - \Delta_L^D) - (\Delta_S - \Delta_S^D))$$

As described above, the measurements (blocks 801-802) may be repeated multiple times and the lowest observations kept and used in computing the estimate (in block 803). This method of estimating download capacity, which theoretically is accurate, is very sensitive to noise and to the high speed of the download link. However, it is a good starting point to use as an initial value $C_I$ in the algorithm described above and shown in FIG. 6. Furthermore, as described above, other methods may be used to provide the initial estimate (e.g. a fixed value) where the method described with reference to FIG. 8 proves not to provide a value in practice.

Utilization of Wireless Links

Figure 9:
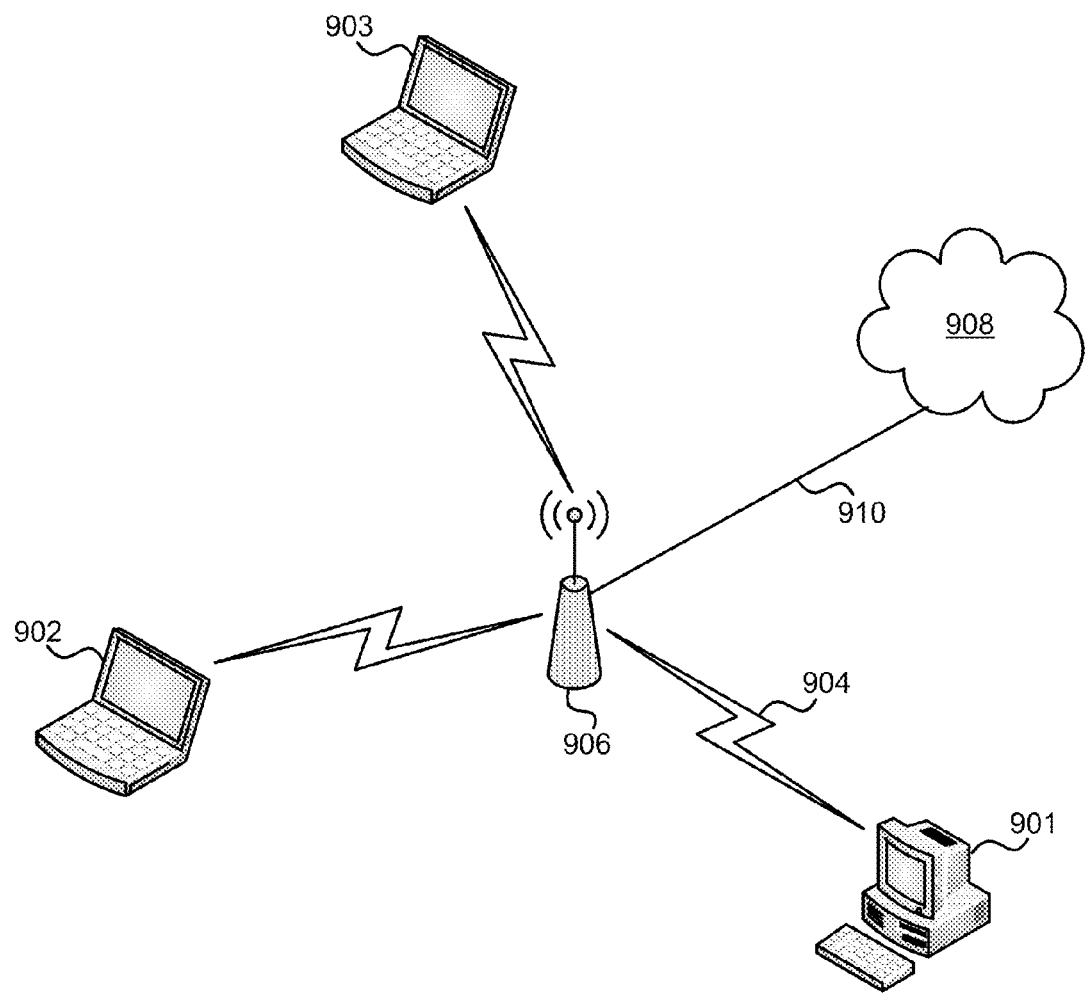
FIG. 9 is a schematic diagram of another small network.

The methods described above with reference to FIGS. 1-4 involve the computation of the utilization of a resource (blocks 203, 401 and 404) and as described above the method used for this computation depends on the technology of the resource. For a wired resource, such as a broadband link 108 or a wired link 110 between an end host and a gateway the utilization is defined in equation (4) above, but this is not suitable for wireless links. FIG. 9 is schematic diagram of a small wireless network which comprises three end hosts 901-903 connected via wireless links 904 to an AP 906. The term 'small wireless network' is used herein to refer to networks with not more than tens of end hosts and at most a few APs. In this example, the AP 906 is connected to the internet 908 via a broadband link 910. Computing the capacity of a wireless network, such as shown in FIG. 9, is complex because it is a dynamic parameter which is dependent upon many factors including the number of end hosts and the association rates of those hosts.

For wireless resources (i.e. A is wireless), the following definition of utilization may be used:

$$\rho_A = \frac{1}{\beta} \sum_{f \in F_A, ij} \hat{x}_{f \ni ij} T_{ij} \qquad (5)$$

where the summation is over all wireless channels ij and all flows f that use wireless and depends on the wireless link(s) that each flow uses and the performance characteristics, $T_{ij}$, of each link. Parameter $x_{f \ni ij}$ is the observed rate of flow f and the parameter $T_{ij}$ is the average transmission time for a packet of average size $L_{ij}$ bytes transmitted from host i to host j where host i has an association rate of $r_{ij}$ (either i or j is the AP 906 and the other is an end host 901-903) and the way $T_{ij}$ is computed depends on the wireless technology used and this is described in more detail below with reference to FIG. 11. A derivation of equation (5) is set out below.

Let $x_{f \ni ij}$ be the rate of flow f, i.e. $x_{f \ni ij} = x_f$ if and only if f uses the wireless link from host i to host j, and $x_{f \ni ij} = 0$ otherwise. For example, if i is a wireless node (e.g. end host 901 in FIG. 9) and j is the wireless access point (e.g. AP 906 in FIG. 9), then $x_{f \ni ij} = x_f$ for all flows f that leave i and are destined to a node on the wired network (not shown in FIG. 9) or to the Internet (908 in FIG. 9). Similarly, $x_{f \ni ij} = x_f$ for traffic destined to i coming from the wired network or the Internet. If k is another wireless node and there are some flows from i to k, then $x_{f \ni ij} = x_f$ and $x_{f \ni jk} = x_f$ for each such flow f (assuming the typical case that the traffic is relayed by the access point j). The flows of the last example use the wireless network twice.

For each vector of feasible rates $\{x_f\}$ (measured in MAC frames per second) when the system is stable, the probability that a packet being scheduled at the wireless medium is from flow f at node i is:

$$x_{f \ni ij} \bigg/ \sum_{f', i', j'} x_{f' \ni i' j'}$$

This holds regardless of the scheduling policy among wireless nodes, or the policy used at each individual node because the network is not saturated, hence all packets will be served.

The average time between two consecutive transmissions is $$T_R = \sum_{f,ij} (x_{f \ni ij} T_{ij}) \Big/ \sum_{f,ij} x_{f \ni ij} \qquad (6)$$

and the service rate of the wireless network is $\mu=1/T_R$. In sharp contrast to the wired networks, the service rate of the wireless network depends on the offered load, assuming that the wireless links ij differ in performance (i.e. not all $T_{ij}$ are equal). Equation (6) suggests, for example, that the service rate is inversely proportional to the rate carried by the slow wireless link (those with large $T_{ij}$). The network is stable if $$\sum_{f,ij} x_{f \ni ij} < \mu$$

i.e. the total load is smaller than the service rate and hence the feasible rate region is characterized by $$\sum_{f,ij} x_{f \ni ij} T_{ij} < 1 \qquad (7)$$

where $T_{ij}$ is dependent on the wireless technology used, as described in more detail below with reference to FIG. 11. The left hand side of equation (7) is the utilization of the wireless medium, as given in equation (5) above but without the scaling by $1/\beta$. As described above in relation to the wired case, it is beneficial to bound the utilization away from 1 to protect against traffic fluctuations that may lead to saturation (during saturation the rate allocations depend also on the MAC protocol and are not strictly determined by the flow weights). A factor of $1/\beta$ may be used to achieve this bounding, as shown in equation (5) but other methods may alternatively be used. In an example implementation, $\beta=0.95$. Note that equation (7) includes the case when there is cross-traffic among the wireless nodes (e.g. between nodes 901-903 in FIG. 9).

Equation (7) was derived under the assumption that the rates $x_f$ are given in MAC frames per second. It can apply to the rates given in bytes per second under either of the following conditions: (a) the packets are of similar sizes, i.e. $L_{ij} \approx L$, or (b) the transmission overhead is substantial smaller than the packet transmission time.

Figure 10:
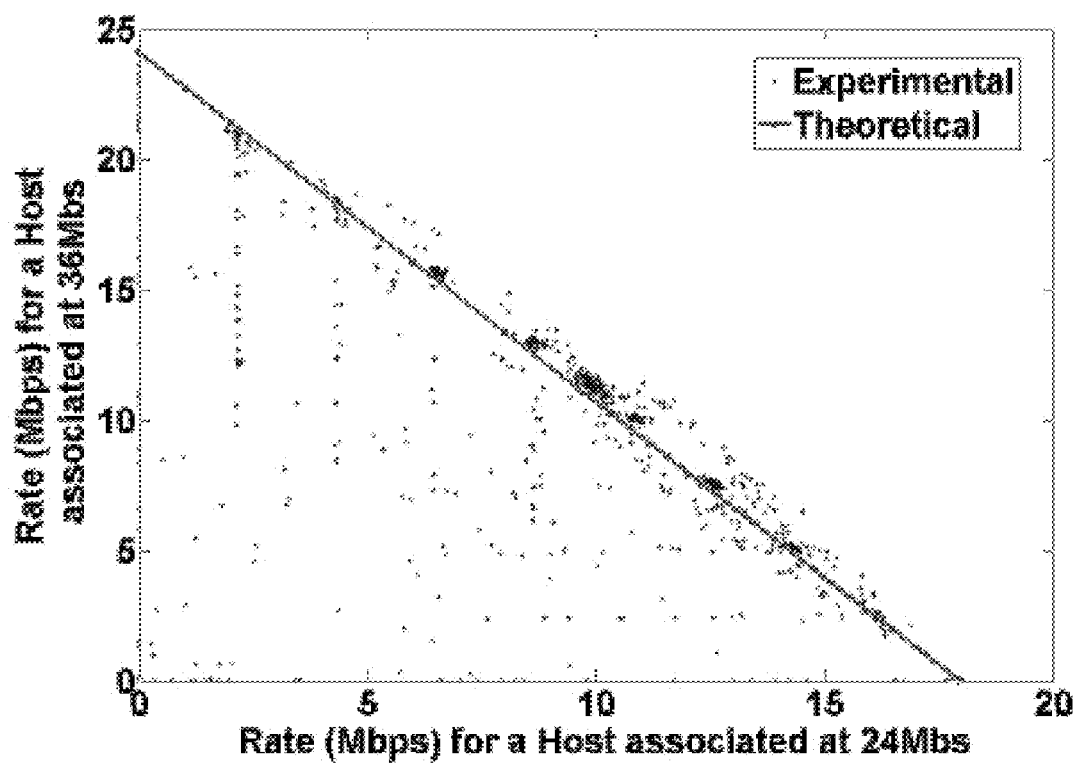
FIG. 10 shows experimental results obtained using methods described herein.

Experimental results have verified equation (7) in a simple setting with 802.11g hosts using backlogged traffic to a wireline host. FIG. 10 shows the results for an experiment with two wireless hosts sending UDP traffic to a wireline host. In the experiment, a rate limit was applied to one of the hosts (0, 2, 6, 8 Mbps and with no rate limits) with the other host not being rate limited (i.e. not controlling $x_f$) and vice versa. The figure shows scatter plots of the throughputs that the two hosts achieved against each other, for experiments that lasted 5 minutes for each of the rate limits (points show averages over 2 seconds). The rate predicted using equation (7) is also shown and there is good agreement with experimental data. The experimental results verified the agreement of equation (7) using up to 4 wireless hosts of varying association rates and the equation is also applicable beyond this number of hosts. Experiments were performed with both UDP and TCP. With TCP the conservation law does not result in an exact straight line due to the association rate adaptation performed for the packets (ACKs) sent by the AP.

As described above, the parameter $T_{ij}$ is the average transmission time for a packet of average size $L_{ij}$ bytes transmitted from host i to host j where host i has an association rate of $r_{ij}$ (either i or j is the AP 906 and the other is an end host 901-903) and the way $T_{ij}$ is computed depends on the wireless technology used. Considering the channel activity on the WLAN (e.g. as shown in FIG. 9), the average transmission time $T_{ij}$ has three components:

$T_C$: the contention period 1101 when hosts are competing for the channel (including backoff times and time lost to collisions), $T_O$: the MAC protocol overhead 1102, 1103, and the MAC packet 1104 that contains the fixed MAC overhead of $b_{MAC}$ bytes and a payload of $L_{ij}$ octets that is transmitted at rate $r_{ij}$, if host i is successful.

Figure 11:
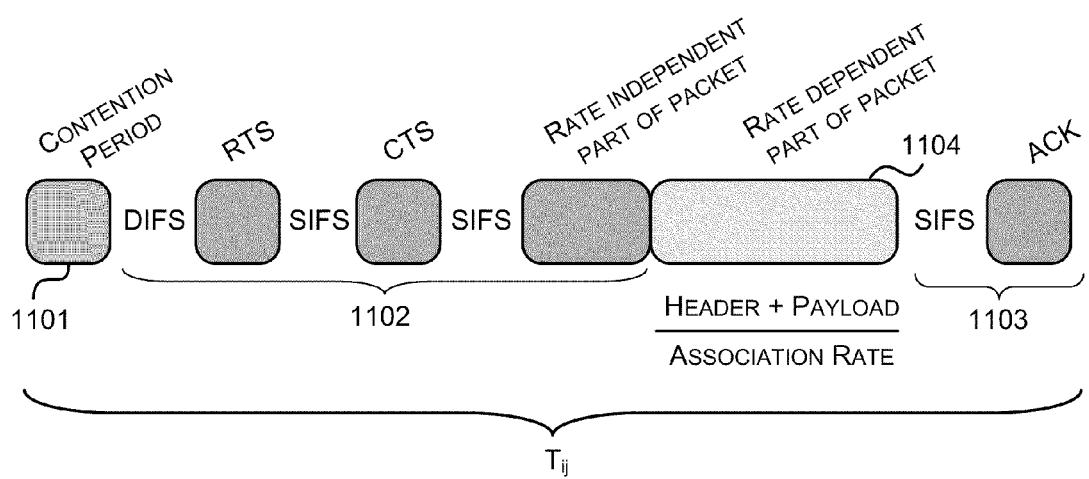
FIG. 11 shows a timeline of a packet in IEEE 802.11g with RTS/CTS enabled.

FIG. 11 shows a schematic diagram which illustrates these times for the case of IEEE 802.11g with RTS/CTS enabled. Similar timelines may be constructed for other variations of the protocol (or for other CSMA (carrier sense multiple access) protocols) and unless explicitly stated, the following discussion uses IEEE 802.11g without RTS/CTS by way of example only. The techniques may also be applied to any other type of communication (e.g. wired communications, although in this case there is no contention period and no collisions); however there are generally alternative approaches to model other domains.

The contention period, $T_C$, 1101 depends on the load (number of active hosts) and is described in more detail below. The MAC protocol overhead, $T_O$, 1102, 1103 consists of the time required to transmit the RTS, CTS and the ACK packets and also the interframe spacings (DIFS, SIFS), thus:

$$T_O = T_{DIFS} + T_{SIFS} + T_{ACK} + T_{PHY}$$

without RTS/CTS, or $$T_O = T_{DIFS} + 3\, T_{SIFS} + T_{ACK} + T_{PHY} + T_{RTS} + T_{CTS}$$

when RTS/CTS is used (as shown in FIG. 11). The average packet transmission time 1104 is $(b_{MAC}+L_{ij})/r_{ij}$. Hence, the average transmission time $T_{ij}$ is:

$$T_{ij} = T_C + T_O + (b_{MAC} + L_{ij})/r_{ij} \qquad (8)$$

The values of 802.11g parameters used in an example implementation are given in the table below:

| Parameter | Value |
| --- | --- |
| $T_S$ (for basic service) | 9 µs |
| $T_{SIFS}$ | 10 µs |
| $T_{DIFS}$ | 28 µs |
| $T_{phy}$ (preamble and header, OFDM) | 20 µs |
| Control Frame rate | Rbs$^{-1}$ |
| $T_{ACK}$ | $T_{phy}$ + 112/R |
| $b_{MAC}$ | 36 Bytes |
| $CW_{min}$ | 15 |
| L | 1500 Bytes |

The analysis above ignores the effects of MAC-level packet collisions. However, collisions can be taken into consideration by adapting the value of $T_C$ (the contention period) for a situation where there are n active hosts. It is assumed that the packets experience very few collisions. This is reasonable because of the small number of hosts in the network and also because $CW_{min}$, the minimum backoff window, is quite large and hence minimizes collisions.

As in most models it is assumed that a transmission attempt results in a collision independent of the other attempts. Let $\gamma(n)$ be the probability of a collision, given a node transmits. It can be shown that:

$$\gamma(n) \approx n \zeta \delta$$

where $\zeta$ is the transmission attempt rate and $\delta$ is the slot length. Of course, $\zeta$ depends on $\gamma(n)$ and the equation is a fixed point equation. Using the approach of G. Bianchi (as described in 'Performance analysis of the IEEE 802.11 distributed coordination function' published in IEEE J. Sel. Areas Commun., 2000) and A. Kumar, D. Manjunath, and J. Kuri (as described in 'Wireless Networking' published by Morgan-Kaufmann (an imprint of Elsevier), USA, 2008), the following first-order approximation for $\gamma(n)$ can be obtained:

$$\gamma(n) = \frac{1}{2(CW_{min} - 2)}\left(4n + CW_{min} - 5 - \sqrt{CW_{min}(CW_{min} - 2) + (4n - 3)^2}\right)$$

Experimental results show that there is a good fit to experimental data using this approximation.

On average, there are $1/(1-\gamma(n))-1=\gamma(n)/(1-\gamma(n))$ collisions and $1/(1-\gamma(n))$ idle slots between successful transmissions for host j. An average idle time between two transmission attempts (successful or not) is $\delta/\gamma(n)$. Therefore:

$$T_C = \frac{\delta}{(1-\gamma(n))\gamma(n)} + \frac{\gamma(n)}{1-\gamma(n)}T_{coll}$$

where $T_{coll}$ is the average duration of a collision and depends on the usage or otherwise of RTS/CTS. If RTS/CTS is used, then:

$$T_{coll} = T_{RTS} + T_{SIFS} + T_{DIFS} + T_{ACK}$$

When RTS/CTS is not used, the exact expression involves accounting for the duration of the longest of the colliding packets and the following conservative approximation may be used:

$$T_{coll} = \max_{ij} \frac{b_{MAC} + L_{ij}}{r_{ij}}$$

Another source of a non negligible loss of capacity is the PHY errors and these errors can occasionally be substantial. It is rather hard to capture PHY errors in a simple model and the hosts react to PHY losses in a rather complex manner which also defies simple characterization. Nevertheless, equation (7) is reasonably accurate and the approximate linear relationship is very useful in defining control algorithms and developing optimization techniques.

Although many wireless networks operate using a single technology or protocol, e.g. IEEE 802.11a or 802.11g, in some cases the network may operate in mixed modes, with some flows/links operating using one protocol and other links operating using other protocols. The methods described above can be adapted to accommodate this situation with end hosts sharing, in addition to rate information, details of the mode used (e.g. 802.11a/b/g). Different methods may then be used to compute the $T_{ij}$ for the relevant flows.

A Central or Decentralized Approach

Figure 8:
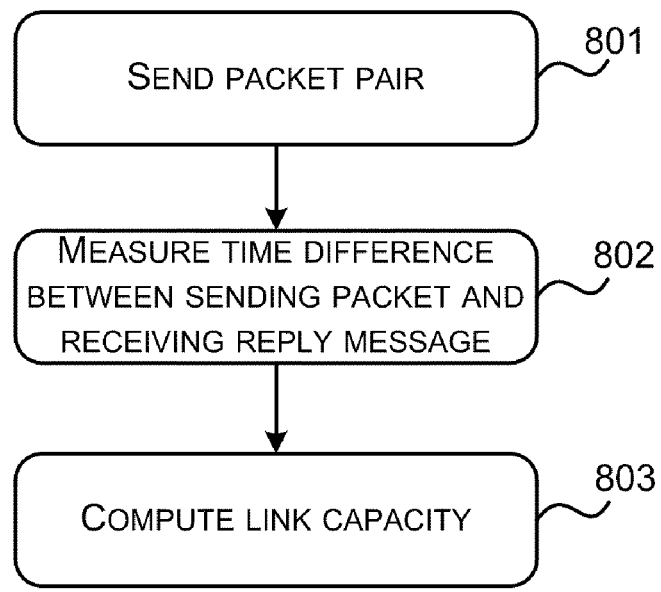
FIG. 8 is a flow diagram of an example method of measuring the link capacity of a broadband access link.

As described above, the methods shown in FIGS. 2 and 4 (which may involve use of one or more of the methods shown in FIGS. 6 and 8) may be implemented centrally, where all end hosts transmit the relevant information (in block 201) to a dedicated host or device that implements the algorithms, performs all estimations, computes the rate limits to be imposed and announces the limits to the hosts (which will implement them). Alternatively, a decentralized approach may be adopted, where hosts share the necessary information and independently perform all computations.

A decentralized approach is incrementally deployable through a light-weight software agent at the hosts; no changes are required to applications, protocols (e.g., MAC, TCP) or devices such as switches and routers which are generally low-cost in small networks. Furthermore, sharing of information (in such a decentralized approach) only bears a minimal overhead due to the small number of hosts. Additionally, hosts are generally better suited to associate traffic information to applications and users than a central entity. In an example implementation, the entire functionality of coordination and control may be implemented at the hosts. Each host periodically (e.g. every second in an implementation) polls the operating system for application specific performance information like connection, and network interface statistics. Then, the necessary information for the algorithms, such as application rates $x_f$, weights $w_f$, average packet size $L_{ij}$, and the association rates $r_{ij}$, is broadcast to all other nodes in the network. This broadcast communication uses an efficient and reliable communication channel, with modest capacity for control traffic, for timely delivery of the information.

A token-bucket approach may be used for rate limiting and shaping. The token rate for each connection may be set to be equal to the rate determined in block 202 or 407. The implementation of rate limiting for outgoing traffic may be based on the Microsoft® Windows® OS traffic control interface. For incoming traffic from the Internet, there is unlikely to be control over the sender, and therefore rate limiting may be applied at the receiver with the expectation that higher-level congestion controllers (such as TCP) will react by rate adaptation.

An Exemplary Computing-Based Device

Figure 12:
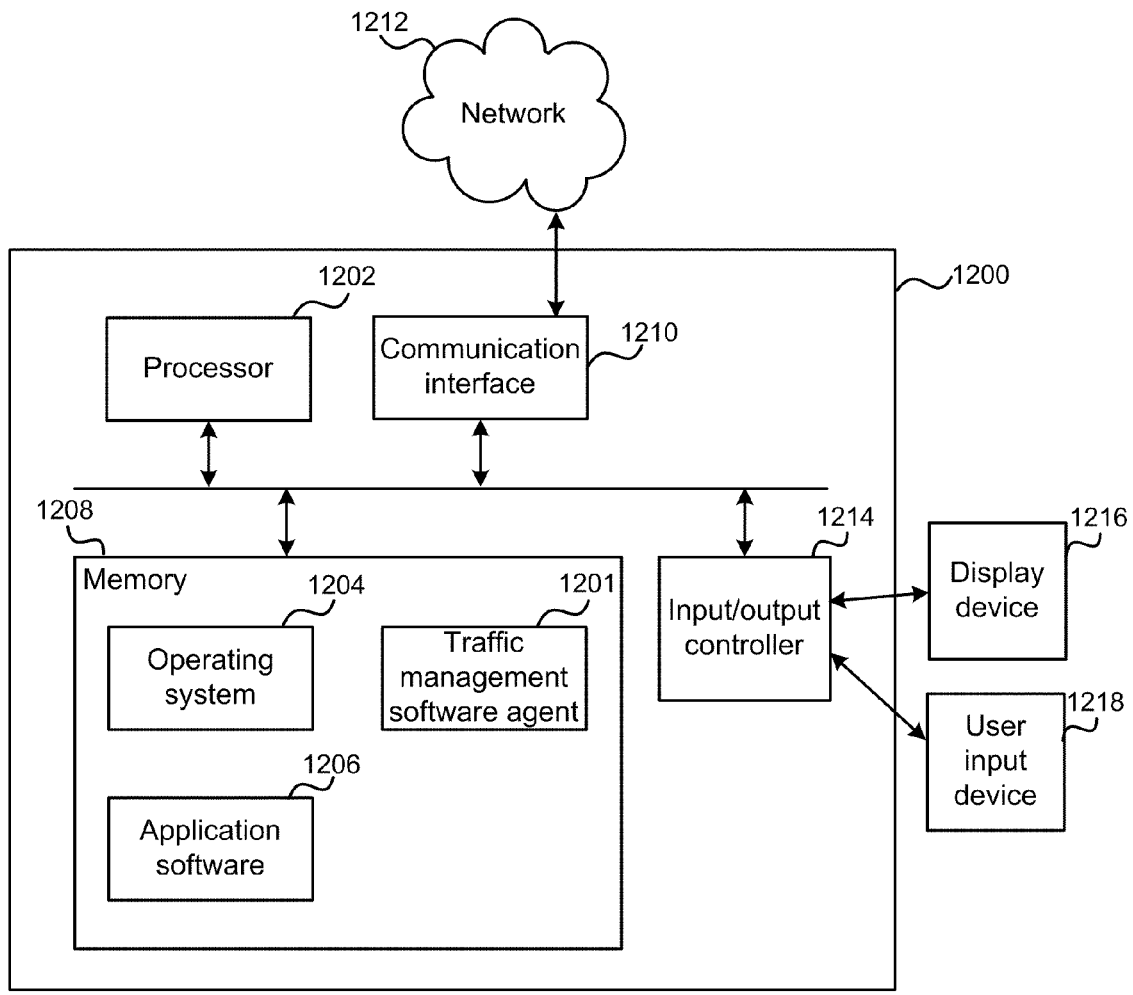
FIG. 12 illustrates an exemplary computing-based device in which embodiments of the methods described herein may be implemented.

FIG. 12 illustrates various components of an exemplary computing-based device 1200 which may be an end host or a central entity which implements the traffic management methods described above. Where the device 1200 is an end host, the device may be, for example, a desktop or laptop computer, a games console, a smart phone or PDA etc. The traffic management methods are implemented by a software agent 1201.

Computing-based device 1200 comprises one or more processors 1202 which may be microprocessors, controllers or any other suitable type of processors for processing computing executable instructions to control the operation of the device in order to perform the traffic management methods described above. Platform software comprising an operating system 1204 or any other suitable platform software may be provided at the computing-based device to enable application software 1206, including the software agent 1201 to be executed on the device.

The computer executable instructions may be provided using any computer-readable media that is accessible by computing based device 1200. Computer-readable media may include, for example, computer storage media such as memory 1208 and communications media. Computer storage media, such as memory 1208, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1208) is shown within the computing-based device 1200 it will be appreciated that the storage may be distributed or located remotely and accessed via a network or other communication link (e.g. using communication interface 1210).

The communication interface 1210 provides an interface to the network 1212 comprising other end hosts and may also include a link to the internet. This communication interface 1210 is used to share rate data (e.g. in block 201) and may be used by the entity to receive data required to perform the algorithms from end hosts (in block 202, where the device 1200 performs the computations). If the device is a central entity which performs the computation of rate limits (using software agent 1201), the communication interface 1210 is used to transmit rate limits to each end host where they can be implemented.

The computing-based device 1200 may also comprise an input/output controller 1214 arranged to output display information to a display device 1216 which may be separate from or integral to the computing-based device 1200. The display information may provide a graphical user interface. The input/output controller 1214 may also be arranged to receive and process input from one or more devices, such as a user input device 1218 (e.g. a mouse or a keyboard). This user input may, for example, be used to set the flow weights or to provide information used in computing these weights. In an embodiment the display device 1216 may also act as the user input device 1218 if it is a touch sensitive display device. The input/output controller 1214 may also output data to devices other than the display device, e.g. a locally connected printing device (not shown in FIG. 12).

Experimental Results

Figure 13:
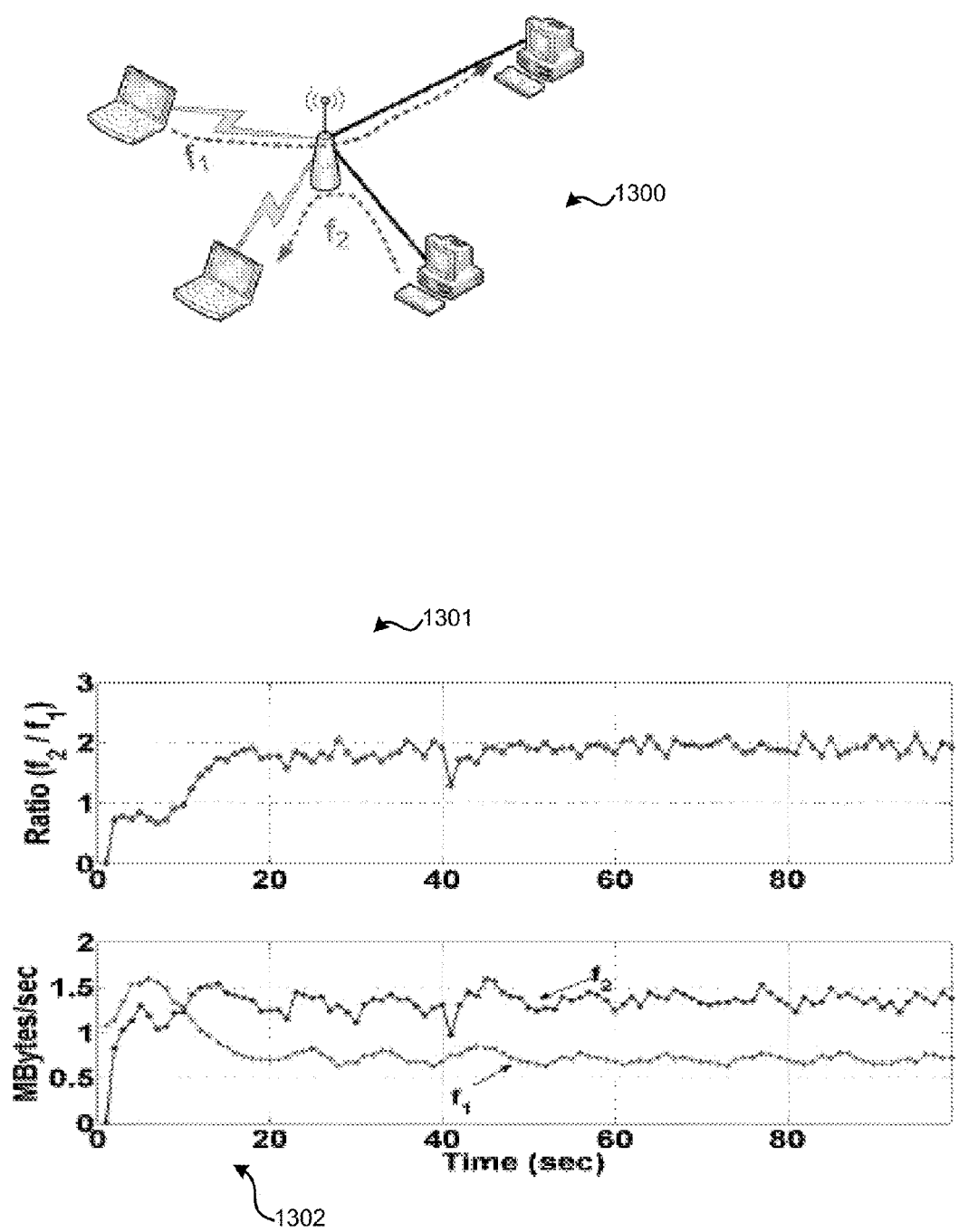
FIGS. 13-15 show experimental results for three different scenarios using the methods described herein.
Figure 14:
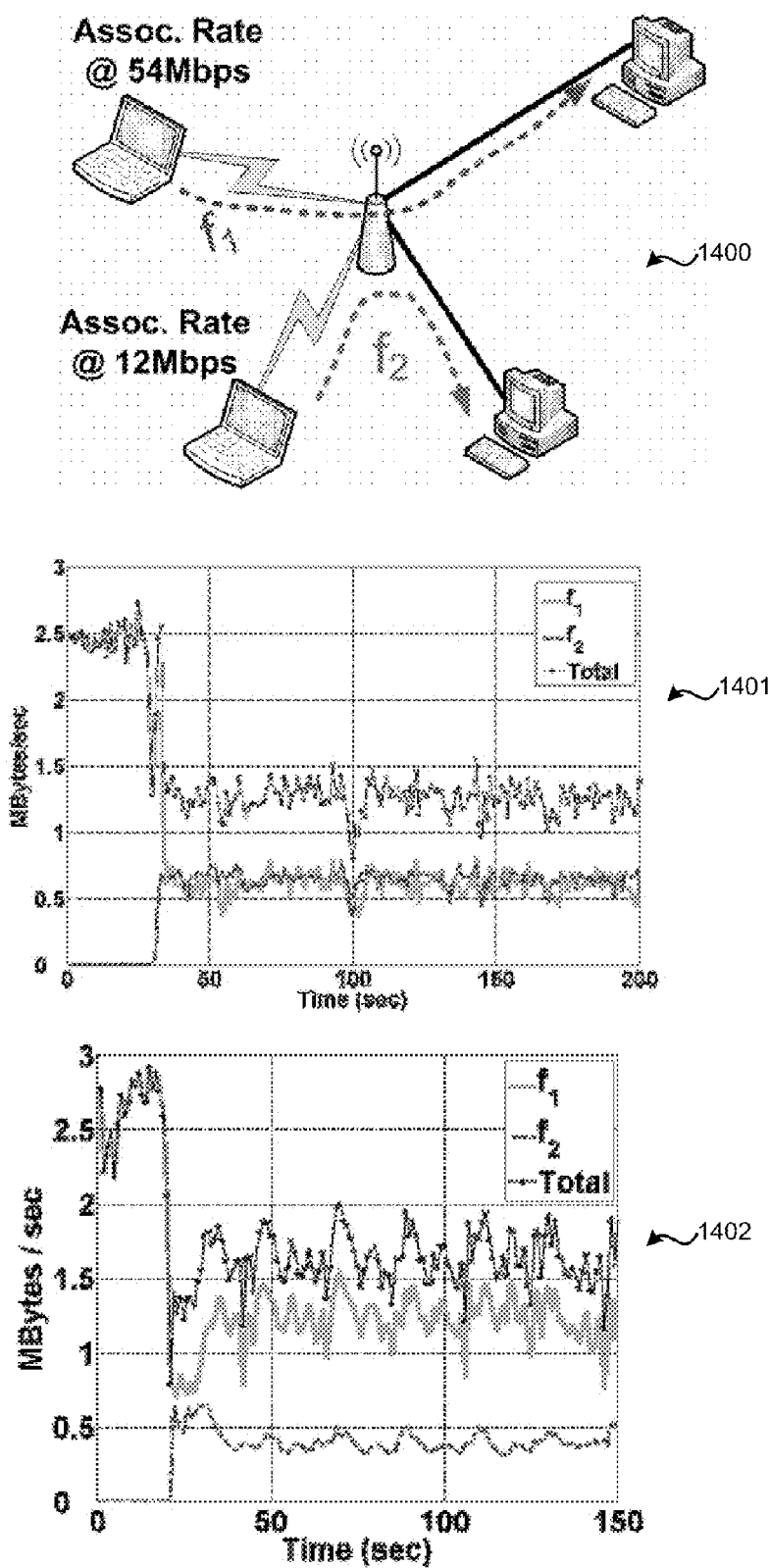
Figure 15:
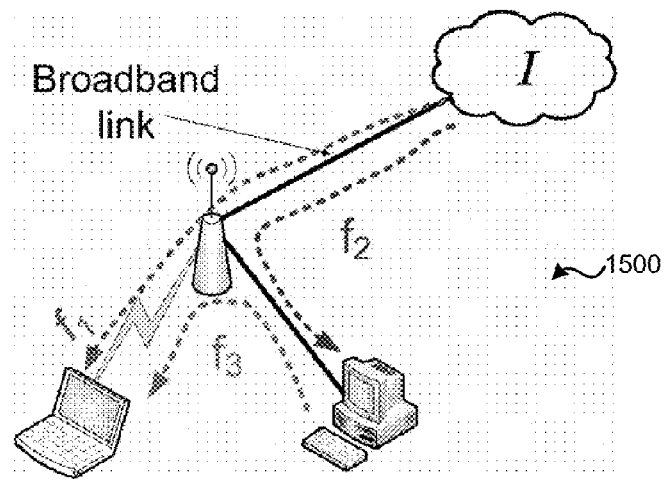
Figure 15:
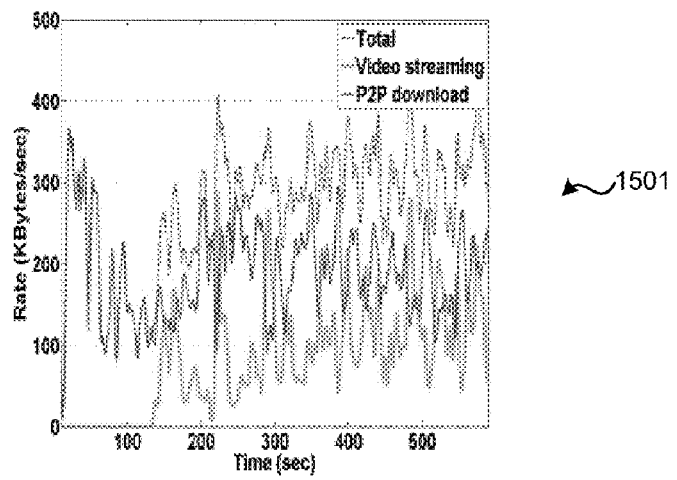
Figure 15:
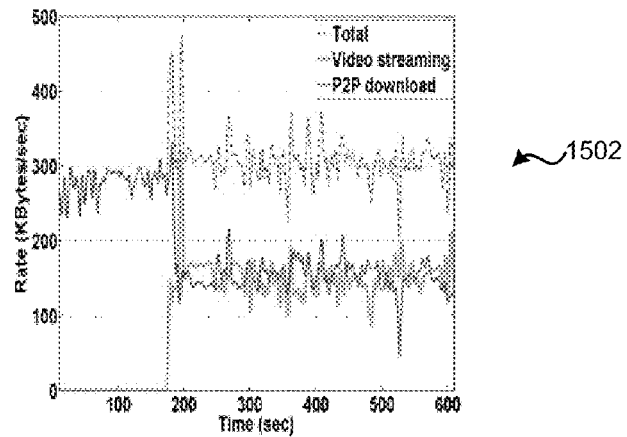

FIGS. 13-15 show experimental results for three different scenarios using the methods described above. FIG. 13 shows a network 1300 where two flows ($f_1$ and $f_2$) compete in the WLAN; $f_2$ is downstream towards the wireless host, while $f_1$ is upstream sourced at the second wireless host. The methods described above can be used to provide higher capacity to one of the wireless flows. As discussed previously, this is currently not feasible without modifying the MAC. In an example, the weights per flow can be configured to be $w_1=1$, and $w_2=2$, implying that the desired policy specifies that $f_2$ should (in this example) experience twice the rate of $f_1$. The two graphs 1301, 1302 present the result of this exercise when the rate controller (which in an example was implemented as a software agent on each end host) is enabled and $f_2$ starts one second after $f_1$. Graph 1301 highlights the achieved ratio between the two flows, while the graph 1302 shows the individual flow rates. The rate controlling client succeeds in allocating rates according to the desired weights, with the average flow ratio over time equal to 1.9. The controller takes roughly 10 seconds to converge, and appears stable despite the variability individual flows may experience due to TCP or wireless channel effects.

FIG. 14 examines the case where channel quality is different among hosts which is not uncommon in residential networks, as shown in the schematic diagram 1400. In such cases, the overall network performance may be degraded as shown in the graphs 1401, 1402. The network arrangement is as shown in FIG. 13, but the two wireless flows ($f_1$ and $f_2$) are sourced at hosts with different association rates. When $f_2$ becomes active roughly at 30 seconds (see graph 1401), the total capacity of the WLAN experiences a drop of roughly 55% due to the small association rate of the wireless host (12 Mbps). Applying rate control can increase overall network performance by giving higher priority to hosts that experience good channel quality. For example, graph 1402 presents a scenario where the weights per flow are configured to be $w_1=3$, and $w_2=1$, effectively allocating the medium with a bias towards the host associated at 54 Mbps. This results in increasing the total WLAN capacity by roughly 20% compared to the uncontrolled case, and the rate limited host achieving a rate of 410 KBps (600 KBps in the uncontrolled case). Depending on the scenario and the extent to which rate-limiting the slow host is desirable, the total capacity of the network will increase as the bias towards the faster hosts increases. Overall, the gain in capacity after applying the controller will be roughly equal to $$1 - \frac{(1+l)(w_1+w_2)}{2(w_1+w_2 l)}$$

where $1/l$ reflects the percentage of capacity lost when slow hosts are introduced in the WLAN. In the particular example, where $1/l \approx 0.55$, the estimated theoretical gain is 0.23 or 23%. Consequently, the methods described above enable mitigation of the network performance loss due to the presence of slow nodes without modifying the MAC. It is also possible to increase the rate of the slow node and, consequently, reduce overall network performance by increasing the weight of the slow node. Hence, it is possible to implement other wireless resource allocation objectives without changing the MAC.

In the example of FIG. 15, the two flows, $f_1$ and $f_2$, (in schematic diagram 1500) represent traffic from high-quality video streaming service and a peer-to-peer (p2p) application respectively. The first graph 1501 depicts the rates of the p2p and the video streaming traffic, when no control is enforced. The p2p traffic captures most of the broadband capacity, resulting in not enough capacity for video playback, causing frequent pauses. Measured ping times averaged 243 ms, and often were in excess of 500 ms. Ping times without traffic are in the order of 30 ms. The second graph 1502 depicts the controlled case when equal weights were assigned to each application. When both applications were active, their rates were similar (151 KB/s and 157 KB/s). Unlike the uncontrolled case, the ping times now were significantly reduced, as the implementation of rate control has reduced the network queuing; the controller allows just enough traffic so that network queues do not grow but the network is utilized at the same time. The average ping time was roughly 55 ms, and less than 3% of the measurements were greater than 150 ms. However, even in this case, the video playback freezes frequently not receiving enough throughput.

To provide a better experience for video streaming, the weight of p2p may be reduced to be 6 times lower than the weight of video streaming and experimental results (not shown in FIG. 15) showed that the video playback did not suffer from pauses. The average ping time was also low, around 68 ms. This means that other (low rate) network applications, such as web browsing and emailing, would also perceive a responsive network. The choice of 6 as the ratio of the weights was arbitrary in order to guarantee that there is enough capacity for the video. In practice, either the user or some other algorithm may be used to determine an appropriate ratio (and weights) in order to guarantee the desired performance, by taking into account the capacity of the network resources and the demands of the applications.

Compared to the first two scenarios examined (and shown in FIGS. 13 and 14), the scenario shown in diagram 1500 is more challenging as p2p applications open a large number of TCP connections, most of which with a small rate. Indeed, during these experiments, the number of connections included in $f_1$ was larger than 200. Even in such an extreme scenario, the controller manages to achieve the desired weighted allocation, and provide a stable performance.

In a similar case to that described above with reference to FIG. 15, with $f_1$ and $f_2$ being upstream flows, and an internal flow f3, this can further have a pronounced impact on the network. The internal flow $f_3$ creates significant queuing in the WLAN, which delays the ACKs of $f_1$, and eventually connection $f_1$ drops. Enabling the controller "reserves" capacity for the ACK stream of flow $f_1$.

Further Variations

Although the present examples are described and illustrated herein as being implemented in a Microsoft® Windows® system, the system described is provided as an example and not a limitation. As those skilled in the art will appreciate, the present examples are suitable for application in a variety of different types of operating systems. In principle, the methods described above do not require any changes to the OS or involve installing specialized device drivers. This additionally means that an implementation can be easily ported to other OS and requires zero or very little changes to the core of the OS.

Furthermore, although the present examples are described and illustrated herein as being implemented in a wired network (as in FIGS. 1 and 3) or a wireless network (as in FIG. 9), the networks described are provided as examples rather than providing limitations. As those skilled in the art will appreciate, the present examples are suitable for application in a variety of different types of networks (e.g. as shown in FIGS. 13-15) which may comprise any combination of wired and/or wireless hosts along with none, one or a few APs or other gateways to the internet.

The term 'computer' or 'computing device' is used herein to refer to any device with processing capability such that it can execute instructions. Those skilled in the art will realize that such processing capabilities are incorporated into many different devices and therefore either of these terms includes PCs, servers, mobile (or other) telephones, personal digital assistants, games consoles and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradeable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of end host based traffic management in a network which is arranged to operate separately from a protocol used within the network, the method comprising:
    receiving data, the data comprising rates for each flow at each end host;
    computing a utilization of a shared resource in the network using the data;
    updating a rate limit for a flow at an end host based on the computed utilization of the shared resource and defined flow weights, wherein updating a rate limit for a flow comprises:
        updating a virtual capacity parameter for the resource based on the computed utilization, wherein updating the virtual capacity parameter comprises:
            increasing the value of the virtual capacity parameter if the computed utilization is below a target value; and
            decreasing the value of the virtual capacity parameter if the computed utilization is above the target value; and
        computing a rate limit for the flow as a portion of the virtual capacity according to the defined flow weights; and
    repeating the method to dynamically update the rate limit for a flow.

2. A method according to claim 1, wherein the method is performed at an end host to update rate limits for a flow at the end host and wherein the method further comprises:
- determining rates at the end host and sharing the data with other end hosts in the network; and
- enforcing the updated rate limit on the flow.

3. A method according to claim 2, wherein sharing the data with other end hosts comprises:
- broadcasting the rates to other end hosts in the network.

4. A method according to claim 1, further comprising:
- computing a utilization of at least a second shared resource in the network;
- updating a rate limit for the flow at an end host based on the computed utilization for the second shared resource and defined flow weights; and
- setting the rate limit for the flow equal to the minimum of the rate limits computed for each shared resource.

5. A method according to claim 1, wherein the shared resource comprises a wireless network and wherein the utilization of the wireless network is proportional to:

$$\sum_{f \in F_A, ij} \hat{x}_{f \ni ij} T_{ij}$$

where $F_A$ is a set of flows using the shared resource, $\hat{x}_{f \ni ij}$ is the observed rate of a flow f from host i to host j and $T_{ij}$ is the average transmission time for a packet of average size transmitted from host i to host j.

6. A method according to claim 5, wherein the utilization of the wireless network is given by:

$$\frac{1}{\beta} \sum_{f \in F_A, ij} \hat{x}_{f \ni ij} T_{ij}$$

where $\beta$ is a constant with a value less than one.

7. A method according to claim 5, wherein the data received further comprises: data identifying technologies used by each end host, application rates for each flow; average packet sizes, packet error rates and association rates of both incoming and outgoing packets for each end host.

8. A method according to claim 1, wherein the protocol comprises one of a wireless MAC protocol and TCP.

9. One or more computer storage devices having stored thereon computer executable instructions that, upon execution, configure a computer to perform a method as recited in claim 1.

10. A computer implemented method of estimating a downlink capacity of a broadband access link, the method comprising:
- at a node in a network connected to the broadband access link, constructing a histogram using packet arrival data for packets received via the broadband internet access link, wherein the node comprises one of an end host and a router;
- extracting one or more modes from the histogram;
- using an initial estimate of capacity, selecting a first mode corresponding to a rate higher than the initial estimate of capacity;
- comparing a number of samples in the selected mode to a number of samples in a next mode corresponding to a higher rate;
- if the number of samples in the selected mode is larger than the number of samples in a next mode, setting the capacity estimate equal to the rate associated with the selected mode; and
- if the number of samples in the selected mode is smaller than the number of samples in a next mode, selecting the next mode and repeating the comparing step.

11. A method according to claim 10, wherein constructing a histogram using packet arrival data comprises:
- collecting data comprising packet arrival times and packet lengths;
- computing inter-packet arrival times;
- removing data for packets having a size smaller than a size threshold and data corresponding to local packets;
- removing inter-packet arrival times below a time threshold; and
- constructing a histogram from the resultant data.

12. A method according to claim 11, further comprising, prior to constructing the histogram:
- computing a rate for each remaining packet; and
- quantizing the rates, and wherein the histogram is constructed using the quantized rate data.

13. A method according to claim 10, wherein the initial estimate of capacity is computed by:
- sending, from the node, a first pair of packets to a remote internet address and a second pair of packets to an entity at a distant end of the broadband access link, each pair of packets comprising a smaller packet and a larger packet and at least the first pair of packets having a small time to live such that they expire at the entity at the distant end of the broadband access link;
- measuring, at the node, a time difference for each packet in each pair, the time difference being between a sending time of the packet and an arrival time of a reply associated with the packet; and
- computing an initial estimate of capacity as the difference between the sizes of the larger and smaller packets divided by:

$$(\Delta_L - \Delta_L^D) - (\Delta_S - \Delta_S^D)$$

where $\Delta_L$ and $\Delta_S$ are the time differences associated with the larger and smaller packets in the first pair respectively and $\Delta_L^D$ and $\Delta_S^D$ are the time differences associated with the larger and smaller packets in the second pair respectively.

14. One or more computer storage devices having stored thereon computer executable instructions that, upon execution, configure a computer to perform a method as recited in claim 10.

15. A method of end host based traffic management in a wireless network which is arranged to operate separately from an access control protocol used within the network, the method comprising:
- at a wireless end host, determining data for each flow at the end host, the data for each flow comprising an application rate, association rate, average packet size and a packet error rate;
- broadcasting the flow data to other end hosts in the network;
- receiving, at the wireless end host, flow data from the other end hosts;
- using the flow data to estimate a utilization of the wireless network;
- updating rate limits for one or more flows at the end host based on the estimated utilization and per-flow weights, wherein updating the rate limits for each flow comprises:

updating a virtual capacity parameter for the wireless network based on the estimated utilization, wherein updating the virtual capacity parameter comprises:
increasing the value of the virtual capacity parameter if the estimated utilization is below a target value; and
decreasing the value of the virtual capacity parameter if the estimated utilization is above the target value; and
computing a rate limit for one or more of the flows as a fraction of the virtual capacity according to the per-flow weights;
applying the updated rate limits to the one or more flows; and
periodically repeating the method to dynamically update the rate limits.

16. A method according to claim 15, wherein the utilization of the wireless network is given by:

$$\frac{1}{\beta} \sum_{f \in F_A, ij} \hat{x}_{f \ni ij} T_{ij}$$

where $F_A$ is a set of flows using the wireless network, $x_{f \ni ij}$ is the observed rate of a flow f from host i to host j, $T_{ij}$ is the average transmission time for a packet of average size transmitted from host i to host j and $\beta$ is a constant with a value less than one.

17. A method according to claim 15, the method further comprising:
estimating a utilization of broadband access link in the network using the flow data;
updating the rate limit for a flow at the end host based on the estimated utilization of the broadband access link and defined flow weights; and
setting the rate limit for the flow equal to the minimum of the rate limits computed for each of the wireless network and the broadband access link.

18. One or more computer storage devices having stored thereon computer executable instructions that, upon execution, configure a computer to perform a method as recited in claim 15.

19. A method of end host based traffic management in a network which is arranged to operate separately from a protocol used within the network, the method comprising:
receiving data, the data comprising rates for each flow at each end host;
computing a utilization of a shared resource in the network using the data, wherein the shared resource comprises a broadband internet access link, computing the utilization of the shared resource comprises estimating a capacity of the broadband internet access link and wherein estimating the capacity of the broadband internet access link comprises:
constructing a histogram using packet arrival data for packets received via the broadband internet access link;
extracting one or more modes from the histogram;
using an initial estimate of capacity, selecting a first mode corresponding to a rate higher than the initial estimate of capacity;
comparing a number of samples in the selected mode to a number of samples in a next mode corresponding to a higher rate;
if the number of samples in the selected mode is larger than the number of samples in a next mode, setting the capacity estimate equal to the rate associated with the selected mode; and
if the number of samples in the selected mode is smaller than the number of samples in a next mode, selecting the next mode and repeating the comparing step;
updating a rate limit for a flow at an end host based on the computed utilization of the shared resource and defined flow weights; and
repeating the method to dynamically update the rate limit for a flow.

20. A method according to claim 19, wherein constructing a histogram using packet arrival data comprises:
collecting data comprising packet arrival times and packet lengths;
computing inter-packet arrival times;
removing data for packets having a size smaller than a size threshold and data corresponding to local packets;
removing inter-packet arrival times below a time threshold; and
constructing a histogram from the resultant data.

21. One or more computer storage devices having stored thereon computer executable instructions that, upon execution, configure a computer to perform a method as recited in claim 19.

* * * * *